US012800965B2

(12) United States Patent
Yanai et al.

(10) Patent No.: US 12,800,965 B2
(45) Date of Patent: Nov. 17, 2026

(54) MANUFACTURING METHOD OF ALIGNMENT FILM AND MANUFACTURING DEVICE OF ALIGNMENT FILM

(71) Applicant: FUJIFILM Corporation, Tokyo (JP)

(72) Inventors: Yujiro Yanai, Minamiashigara (JP); Wataru Majima, Minamiashigara (JP); Makoto Kamo, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 135 days.

(21) Appl. No.: 19/051,407

(22) Filed: Feb. 12, 2025

(65) Prior Publication Data

US 2025/0180953 A1 Jun. 5, 2025

Related U.S. Application Data

(63) Continuation of application No. PCT/JP2023/032415, filed on Sep. 5, 2023.

(30) Foreign Application Priority Data

Sep. 26, 2022 (JP) ................................ 2022-152665

(51) Int. Cl.
*G02F 1/1337* (2006.01)

(52) U.S. Cl.
CPC .............................. *G02F 1/133788* (2013.01)

(58) Field of Classification Search
CPC . G02F 1/133788; G02F 1/1303; G02F 1/0136
(Continued)

(56) References Cited

U.S. PATENT DOCUMENTS 7,196,758 B2 3/2007 Crawford et al.
11,119,257 B2 9/2021 Tabirian et al.
(Continued)

FOREIGN PATENT DOCUMENTS

JP 2015-152828 A 8/2015
WO WO 2014/064742 A1 5/2014

OTHER PUBLICATIONS

International Preliminary Report on Patentability, dated Mar. 1, 2025, and Written Opinion of the International Searching Authority, dated Nov. 21, 2023, with English translation, for International Application No. PCT/JP2023/032415.
(Continued)

*Primary Examiner* — David Y Chung
(74) *Attorney, Agent, or Firm* — Birch, Stewart, Kolasch & Birch, LLP

(57) ABSTRACT

Provided are a manufacturing method of an alignment film having a fine pattern and a manufacturing device of an alignment film. A first polarized light irradiating step to a third polarized light irradiating step carried out on a photo-alignment film material layer provided on a substrate are steps of irradiating the photo-alignment film material layer with linearly polarized light in a first polarization direction to linearly polarized light in a third polarization direction, in which intensities of light are adjusted to obtain a first irradiation light amount pattern to a third irradiation light amount pattern on the photo-alignment film material layer provided on the substrate. In the second polarized light irradiating step, in a case where the first polarization direction is defined as 0° and counterclockwise is defined as positive, the second polarization direction θ2 satisfies 10°<θ2<90°. In the third polarized light irradiating step, the third polarization direction θ3 satisfies 10°<θ3<90° and θ3+θ2>90°. An irradiation light pattern formed by superimposing the first irradiation light amount pattern to the third
(Continued)

irradiation light amount pattern has at least a first overlapping region to a third overlapping region.

20 Claims, 19 Drawing Sheets

(58) Field of Classification Search
USPC .......................................................... 349/56
See application file for complete search history.

(56) References Cited

U.S. PATENT DOCUMENTS

| | | | | |
|---|---|---|---|---|
| 2015/0227057 | A1 | 8/2015 | Umezawa et al. | |
| 2016/0339473 | A1 | 11/2016 | Okawa et al. | |
| 2019/0258121 | A1* | 8/2019 | Fujiwara .............. | G02B 5/3033 |
| 2023/0314878 | A1* | 10/2023 | He ........................ | G02F 1/0136 349/33 |

OTHER PUBLICATIONS

International Search Report for International Application No. PCT/JP2023/032415, dated Nov. 21, 2023, with English translation.

* cited by examiner

MANUFACTURING METHOD OF ALIGNMENT FILM AND MANUFACTURING DEVICE OF ALIGNMENT FILM

CROSS-REFERENCE TO RELATED APPLICATIONS

This application is a Continuation of PCT International Application No. PCT/JP2023/032415 filed on Sep. 5, 2023, which claims priority under 35 U.S.C. § 119(a) to Japanese Patent Application No. 2022-152665 filed on Sep. 26, 2022. The above applications are hereby expressly incorporated by reference, in their entirety, into the present application.

BACKGROUND OF THE INVENTION

1. Field of the Invention

The present invention relates to a manufacturing method of an alignment film and a manufacturing device of an alignment film, in which the alignment film is obtained by irradiating a photo-alignment film material layer with linearly polarized light.

2. Description of the Related Art

Currently, polarized light is used for forming an alignment film or the like in an optical element, a liquid crystal display device, and the like. The method using polarized light has an advantage that an alignment direction can be varied in various ways in a plane, as compared with a case where an alignment film is formed using a rubbing or stretching substrate known in the related art.

For example, U.S. Pat. No. 7,196,758B describes an interference exposure method in which an alignment material is exposed to an interference pattern. In U.S. Pat. No. 7,196,758B, an alignment film is formed in which the alignment direction is patterned in a stripe pattern. In addition, for example, U.S. Ser. No. 11/119,257B describes an interference exposure method in which an alignment film is formed using a circular interference pattern having a circularly polarized state. In U.S. Ser. No. 11/119,257B, an alignment film is formed in which the alignment direction is patterned in a circular pattern.

SUMMARY OF THE INVENTION

In both of the above-mentioned U.S. Pat. No. 7,196,758B and U.S. Ser. No. 11/119,257B, an alignment film having a stripe pattern or a circular pattern is formed by an interference exposure method. In the interference exposure methods described in U.S. Pat. No. 7,196,758B and U.S. Ser. No. 11/119,257B, a geometrically simple pattern such as a stripe pattern or a circular pattern can be formed. However, it is difficult to form a fine pattern such as a geometrically complex pattern including a pattern in which the alignment direction is not parallel instead of a simple stripe pattern, or a pattern in which the alignment direction changes like a vortex instead of a simple circular pattern.

An object of the present invention is to provide a manufacturing method of an alignment film having a fine pattern and a manufacturing device of an alignment film.

The above-mentioned object can be achieved by the following configurations.

Invention [1] is a manufacturing method of an alignment film, including: a first polarized light irradiating step, a second polarized light irradiating step, and a third polarized light irradiating step that are carried out on a photo-alignment film material layer provided on a substrate, in which the first polarized light irradiating step is a step of irradiating the photo-alignment film material layer with linearly polarized light in a first polarization direction, in which an intensity of light is adjusted such that a first irradiation light amount pattern is obtained, on the photo-alignment film material layer provided on the substrate, the second polarized light irradiating step is a step of irradiating the photo-alignment film material layer with linearly polarized light in a second polarization direction, in which an intensity of light is adjusted such that a second irradiation light amount pattern is obtained, on the photo-alignment film material layer provided on the substrate, and in a case where the second polarization direction is defined as θ2, the first polarization direction is defined as 0°, and counterclockwise with respect to the first polarization direction is defined as positive, the second polarization direction θ2 satisfies 10°<θ2<90°, the third polarized light irradiating step is a step of irradiating the photo-alignment film material layer with linearly polarized light in a third polarization direction, in which an intensity of light is adjusted such that a third irradiation light amount pattern is obtained, on the photo-alignment film material layer provided on the substrate, and in a case where the third polarization direction is defined as θ3, the second polarization direction is defined as 0°, and the counterclockwise with respect to the first polarization direction is defined as positive, the third polarization direction θ3 satisfies 10°<θ3<90° and θ3+θ2>90°, the first polarized light irradiating step, the second polarized light irradiating step, and the third polarized light irradiating step are carried out in a state where a position of a laminate in which the photo-alignment film material layer is provided on the substrate is fixed, and an irradiation light pattern formed by superimposing the first irradiation light amount pattern, the second irradiation light amount pattern, and the third irradiation light amount pattern on the photo-alignment film material layer has at least a first overlapping region where the first irradiation light amount pattern and the second irradiation light amount pattern overlap, a second overlapping region where the first irradiation light amount pattern and the third irradiation light amount pattern overlap, and a third overlapping region where the second irradiation light amount pattern and the third irradiation light amount pattern overlap.

Invention [2] is the manufacturing method of an alignment film according to Invention [1], in which, in the irradiation light pattern, the first overlapping region and the second overlapping region are connected by a first connection region to which only the linearly polarized light in the first polarization direction is applied, the first overlapping region and the third overlapping region are connected by a second connection region to which only the linearly polarized light in the second polarization direction is applied, and the second overlapping region and the third overlapping region are connected by a third connection region to which only the linearly polarized light in the third polarization direction is applied.

Invention [3] is the manufacturing method of an alignment film according to Invention [2], in which, in the irradiation light pattern, the first irradiation light amount pattern has a maximal value of an irradiation light amount in the first connection region, the second irradiation light amount pattern has a maximal value of an irradiation light amount in the second connection region, and the third irradiation light amount pattern has a maximal value of an irradiation light amount in the third connection region.

Invention [4] is the manufacturing method of an alignment film according to any one of Inventions [1] to [3], in which the laminate in which the photo-alignment film material layer is provided on the substrate is a single sheet-like body.

Invention [5] is the manufacturing method of an alignment film according to any one of Inventions [1] to [4], in which an alignment pattern formed in the photo-alignment film material layer has a non-parallel pattern depending on the irradiation light pattern.

Invention [6] is the manufacturing method of an alignment film according to Invention [5], in which the non-parallel pattern is a pattern in which an alignment direction changes in a circular manner in at least one direction.

Invention [7] is the manufacturing method of an alignment film according to any one of Inventions [1] to [4], in which an alignment pattern formed in the photo-alignment film material layer is a vortex alignment pattern depending on the irradiation light pattern.

Invention [8] is the manufacturing method of an alignment film according to any one of Inventions [1] to [4], in which an alignment pattern formed in the photo-alignment film material layer includes a pattern in which an alignment angle changes in proportion to a polar angle in polar coordinate display from a center, depending on the irradiation light pattern.

Invention [9] is the manufacturing method of an alignment film according to any one of Inventions [1] to [8], in which a mask is used for adjusting the intensity of the light in the first polarized light irradiating step, the second polarized light irradiating step, and the third polarized light irradiating step.

Invention [10] is the manufacturing method of an alignment film according to Invention [9], in which the mask is disposed in close contact with the photo-alignment film material layer in the first polarized light irradiating step, the second polarized light irradiating step, and the third polarized light irradiating step.

Invention [11] is the manufacturing method of an alignment film according to Invention [9], in which the mask used for adjusting the intensity of the light has regions having different transmittances corresponding to each of the first irradiation light amount pattern, the second irradiation light amount pattern, and the third irradiation light amount pattern.

Invention [12] is the manufacturing method of an alignment film according to any one of Inventions [1] to [8], in which, in the first polarized light irradiating step, the second polarized light irradiating step, and the third polarized light irradiating step, the adjustment of the intensity of the light adjusts an emission intensity of a light source.

Invention [13] is the manufacturing method of an alignment film according to any one of Inventions [1] to [12], further including a photo-alignment film material layer forming step of providing a photo-alignment film material on the substrate to form the photo-alignment film material layer prior to the first polarized light irradiating step.

Invention [14] is a manufacturing device of an alignment film, including a stage on which a laminate in which a photo-alignment film material layer is provided on a substrate is placed, and an irradiation unit that carries out first polarized light irradiation, second polarized light irradiation, and third polarized light irradiation on the photo-alignment film material layer of the laminate, in which the irradiation unit includes a light source unit that emits linearly polarized light in a first polarization direction, linearly polarized light in a second polarization direction, and linearly polarized light in a third polarization direction to the photo-alignment film material layer of the laminate, and an adjustment unit that adjusts the light source unit such that an intensity of the linearly polarized light in the first polarization direction forms a first irradiation light amount pattern on the photo-alignment film material layer provided on the substrate, adjusts the light source unit such that an intensity of the linearly polarized light in the second polarization direction forms a second irradiation light amount pattern on the photo-alignment film material layer provided on the substrate, and adjusts the light source unit such that an intensity of the linearly polarized light in the third polarization direction forms a third irradiation light amount pattern on the photo-alignment film material layer provided on the substrate, and the adjustment unit further adjusts an irradiation light pattern formed by superimposing the first irradiation light amount pattern, the second irradiation light amount pattern, and the third irradiation light amount pattern on the photo-alignment film material layer such that the irradiation light pattern has at least a first overlapping region where the first irradiation light amount pattern and the second irradiation light amount pattern overlap, a second overlapping region where the first irradiation light amount pattern and the third irradiation light amount pattern overlap, and a third overlapping region where the second irradiation light amount pattern and the third irradiation light amount pattern overlap, in a case where the second polarization direction is defined as $\theta 2$, the first polarization direction is defined as 0°, and counterclockwise with respect to the first polarization direction is defined as positive, the second polarization direction $\theta 2$ satisfies $10° < \theta 2 < 90°$, and in a case where the third polarization direction is defined as $\theta 3$, the second polarization direction is defined as 0°, and the counterclockwise with respect to the first polarization direction is defined as positive, the third polarization direction $\theta 3$ satisfies $10° < \theta 3 < 90°$ and $\theta 3 + \theta 2 > 90°$, and the first polarized light irradiation, the second polarized light irradiation, and the third polarized light irradiation by the irradiation unit are carried out in a state where a position of the laminate placed on the stage is fixed.

Invention [15] is the manufacturing device of an alignment film according to Invention [14], in which, in the irradiation light pattern, the first overlapping region and the second overlapping region are connected by a first connection region to which only the linearly polarized light in the first polarization direction is applied, the first overlapping region and the third overlapping region are connected by a second connection region to which only the linearly polarized light in the second polarization direction is applied, and the second overlapping region and the third overlapping region are connected by a third connection region to which only the linearly polarized light in the third polarization direction is applied.

Invention [16] is the manufacturing device of an alignment film according to Invention [15], in which, in the irradiation light pattern, the first irradiation light amount pattern has a maximal value of an irradiation light amount in the first connection region, the second irradiation light amount pattern has a maximal value of an irradiation light amount in the second connection region, and the third irradiation light amount pattern has a maximal value of an irradiation light amount in the third connection region.

Invention [17] is the manufacturing device of an alignment film according to any one of Inventions [14] to [16], in which the laminate in which the photo-alignment film material layer is provided on the substrate is a single sheet-like body.

Invention [18] is the manufacturing device of an alignment film according to any one of Inventions [14] to [17], in which an alignment pattern formed in the photo-alignment film material layer has a non-parallel pattern depending on the irradiation light pattern.

Invention [19] is the manufacturing device of an alignment film according to Invention [18], in which the non-parallel pattern is a pattern in which an alignment direction changes in a circular manner in at least one direction.

Invention [20] is the manufacturing device of an alignment film according to any one of Inventions [14] to [17], in which an alignment pattern formed in the photo-alignment film material layer is a vortex alignment pattern depending on the irradiation light pattern.

Invention [21] is the manufacturing device of an alignment film according to any one of Inventions [14] to [17], in which an alignment pattern formed in the photo-alignment film material layer includes a pattern in which an alignment angle changes in proportion to a polar angle in polar coordinate display from a center, depending on the irradiation light pattern.

Invention [22] is the manufacturing device of an alignment film according to any one of Inventions [14] to [21], in which the light source unit has a mask that adjusts the intensity of the light.

Invention [23] is the manufacturing device of an alignment film according to Invention [22], in which the first polarized light irradiation, the second polarized light irradiation, and the third polarized light irradiation are carried out in a state where the mask is disposed in close contact with the photo-alignment film material layer.

Invention [24] is the manufacturing device of an alignment film according to Invention [22], in which the mask that adjusts the intensity of the light has regions having different transmittances corresponding to each of the first irradiation light amount pattern, the second irradiation light amount pattern, and the third irradiation light amount pattern.

According to the present invention, it is possible to provide a manufacturing method of an alignment film having a fine pattern and a manufacturing device of an alignment film.

DESCRIPTION OF THE PREFERRED EMBODIMENTS

Hereinafter, the manufacturing method of an alignment film and the manufacturing device of an alignment film according to the embodiment of the present invention will be described in detail with reference to suitable embodiments shown in the accompanying drawings.

It should be noted that the drawings to be described below are only illustrative for explaining the present invention, and the present invention is not limited to the drawings to be shown below.

In the following, the expression "to" indicating a numerical range includes numerical values written on both sides of "to". For example, in a case where F is a value between a numerical value Fa and a numerical value $\varepsilon_\beta$, the range of F is a range including the numerical value Fa and the numerical value $\varepsilon_\beta$ and is expressed by $\varepsilon_\alpha \le \varepsilon \le \varepsilon_\beta$ in mathematical symbols.

Unless otherwise specified, the meaning of an angle such as "an angle represented by a specific numerical value", "parallel", "vertical", or "orthogonal" includes a case where an error range is generally acceptable in the relevant technical field.

Figure 1:
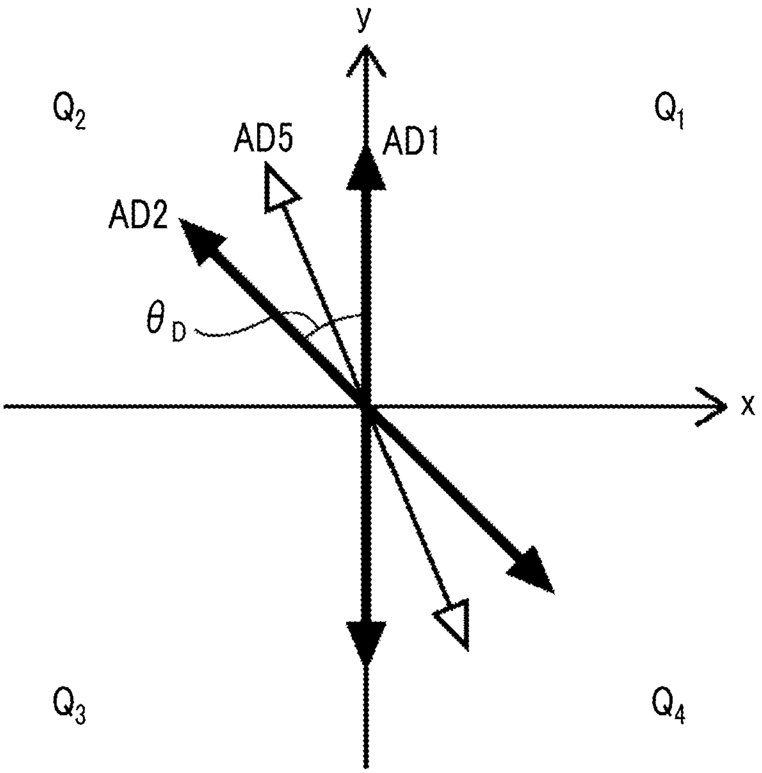
FIG. 1 is a schematic view for explaining alignment in a case of forming an alignment film.
Figure 2:
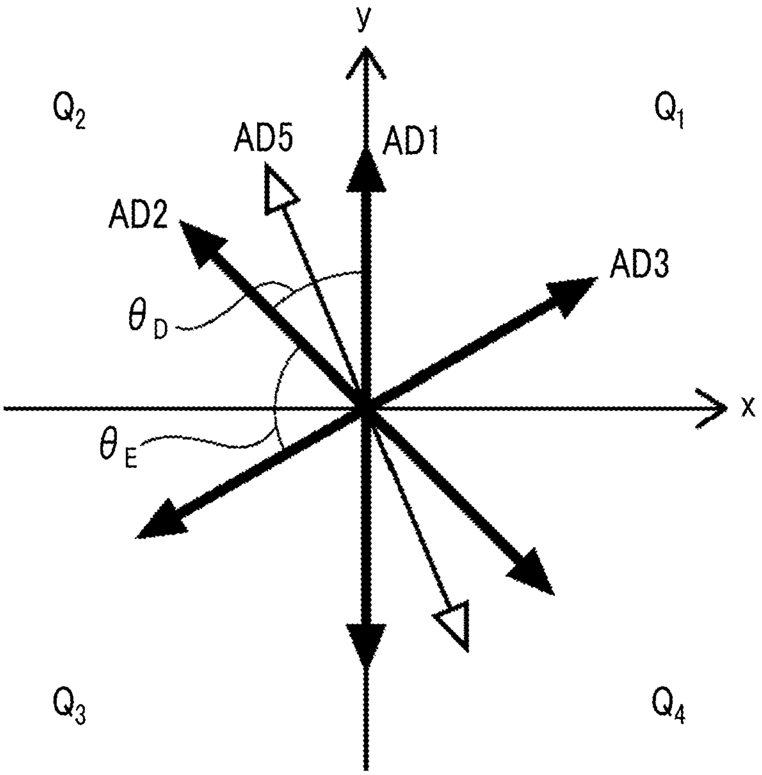
FIG. 2 is a schematic view for explaining alignment in a case of forming an alignment film.

FIG. 1 and FIG. 2 are schematic views for explaining alignment in a case of forming an alignment film.

In a case where an alignment film that affects liquid crystal molecules is formed using a photo-alignment film material layer formed of a photo-alignment film material, the photo-alignment film material layer is irradiated with linearly polarized light. As a result, an alignment restriction force of the liquid crystal molecules is exhibited in the photo-alignment film material layer. The alignment restriction force is qualitatively expressed by a relationship of Expression (1).

$$\text{Alignment restriction force} \propto \text{number of molecules reacting to linearly polarized light} \propto \text{exposure amount.} \quad (1)$$

In a case where the photo-alignment film material layer is sequentially irradiated with linearly polarized light in two different directions of the A1 direction and the A2 direction, alignment restriction forces are exhibited in two alignment directions AD1 and AD2 as shown in FIG. 1. In this case, the liquid crystal molecules on the alignment film tend to be aligned between the alignment restriction forces in two directions (alignment direction AD5 in FIG. 1). The A1 direction and the alignment direction AD1 are the same direction, and the A2 direction and the alignment direction AD2 are the same direction.

Since the photo-alignment film material constituting the photo-alignment film material layer is made of a constant material, the probability of an encounter between the liquid crystal molecules and the molecules of the alignment film that affects the liquid crystal molecules is expressed by Expression (2).

$$\text{Probability of encounter in } AD1 \text{ direction} = \text{exposure amount in } A1 \text{ direction} / (\text{exposure amount in } A1 \text{ direction} + \text{exposure amount in } A2 \text{ direction}). \quad (2)$$

From Expression (2), the alignment restriction force (Average) in two directions of the AD1 direction and the AD2 direction can be expressed as Expression (3) in a case where the unit vector of ADi (i=1, 2) is taken as |ADi| (i=1, 2).

$$\text{Average } (|AD1| \times \text{probability of encounter in } AD1 \text{ direction}, |AD2| \times \text{probability of encounter in } AD2 \text{ direction}. \quad (3)$$

From this, by changing the exposure amount ratio for each location in a case of exposure to each linearly polarized light, the direction of the alignment restriction force can be freely controlled between acute angles of AD1 and AD2.

Next, the alignment restriction force will be described in more detail.

Here, reference numerals AD1, AD2, and AD5 shown in FIG. 1 indicate the alignment directions as described above. In addition, a reference numeral AD3 shown in FIG. 2 indicates an alignment direction.

The x-axis and the y-axis shown in FIG. 1 and FIG. 2 are coordinate axes virtually set on an alignment film (not shown), and the x-axis and the y-axis are orthogonal to each other.

The alignment direction AD1 in FIG. 1 is exhibited by linearly polarized light in the A1 direction. The alignment direction AD2 is exhibited by linearly polarized light in the A2 direction. As described above, the A1 direction and the alignment direction AD1 are the same direction, and the A2 direction and the alignment direction AD2 are the same direction.

An alignment restriction force is generated in each of the alignment direction AD1 and the alignment direction AD2. In this case, the liquid crystal molecules on the alignment film tend to be aligned in the alignment direction AD5 between the alignment direction AD1 and the alignment direction AD2.

Here, the linearly polarized light in the A1 direction is defined as a first polarization direction. Then, it was found that, in a case where counterclockwise with respect to the first polarization direction is defined as positive, the liquid crystal molecules tend to be aligned in the alignment direction AD5 in a case where the second polarization direction θ2 is set to 10°<θ2<90°. That is, in a case where an angle $\theta_D$ between the alignment direction AD1 and the alignment direction AD2 is set to 10°<$\theta_D$<90°, the liquid crystal molecules tend to be aligned in the alignment direction AD5. The alignment restriction force may be canceled out in a case where θ2 is close to 90°, so 10°<θ2<80° is preferable.

It should be noted that the "counterclockwise" is a direction of movement to a first quadrant $Q_1$, a second quadrant $Q_2$, a third quadrant $Q_3$, and a fourth quadrant $Q_4$ in the coordinates of the x-axis and the y-axis shown in FIG. 1 and FIG. 2.

As described above, in a case where two linearly polarized lights having different polarization directions are used, the alignment direction AD5 can only be controlled between 0° and 90°, and the polarization direction cannot be set in all directions. For this reason, linearly polarized light in a third polarization direction is further used.

In a case where the third polarization direction is defined as θ3, the second polarization direction θ2 is defined as 0°, and counterclockwise with respect to the first polarization direction is defined as positive, the third polarization direction θ3 satisfies 10°<θ3<90° and θ3+θ2>90°.

The linearly polarized light in the third polarization direction can cause the alignment film to exhibit an alignment restriction force in the alignment direction AD3 shown in FIG. 2.

With regard to the third polarization direction θ3, as with the second polarization direction θ2 described above, the difference between θ2 and θ3 is less than 90°. In addition, the third polarization direction θ3 needs to be positioned in a different quadrant from the above-mentioned second polarization direction θ2. That is, an angle $\theta_E$ between the alignment direction AD2 and the alignment direction AD3 is less than 90°, and the alignment direction AD3 is positioned in a different quadrant from the alignment direction AD2.

From the above, in a case of manufacturing an alignment film, the first polarized light irradiating step, second polarized light irradiating step, and third polarized light irradiating step described below are carried out on the photo-alignment film material layer while the position of the laminate in which the photo-alignment film material layer is provided on the substrate is fixed, which makes it possible to set the alignment direction in all directions and manufacture an alignment film having a fine pattern such as a geometrically complex pattern including, for example, a pattern in which the alignment direction is not parallel (non-parallel pattern described later) instead of a simple stripe pattern described later, or a pattern in which the alignment direction changes like a vortex (vortex alignment pattern described later) instead of a simple circular pattern.

The first polarized light irradiating step is a step of irradiating a photo-alignment film material layer with linearly polarized light in a first polarization direction, on the photo-alignment film material layer provided on a substrate, the linearly polarized light having an intensity of light adjusted to obtain a first irradiation light amount pattern.

The second polarized light irradiating step is a step of irradiating the photo-alignment film material layer with linearly polarized light in a second polarization direction, on the photo-alignment film material layer provided on the substrate, the linearly polarized light having an intensity of light adjusted to obtain a second irradiation light amount pattern, in which, in a case where the second polarization direction is defined as θ2, the first polarization direction is defined as 0°, and counterclockwise with respect to the first polarization direction is defined as positive, the second polarization direction θ2 satisfies 10°<θ2<90°.

The third polarized light irradiation step is a step of irradiating the photo-alignment film material layer with linearly polarized light in a third polarization direction, on the photo-alignment film material layer provided on the substrate, the linearly polarized light having an intensity of light adjusted to obtain a third irradiation light amount pattern, in which, in a case where the third polarization direction is defined as θ3, the second polarization direction is defined as 0°, and counterclockwise with respect to the first polarization direction is defined as positive, the third polarization direction θ3 satisfies 10°<θ3<90° and θ3+θ2>90°.

Further, an irradiation light pattern formed by superimposing the first irradiation light amount pattern, the second irradiation light amount pattern, and the third irradiation light amount pattern on the photo-alignment film material layer has at least a first overlapping region where the first irradiation light amount pattern and the second irradiation light amount pattern overlap, a second overlapping region where the first irradiation light amount pattern and the third irradiation light amount pattern overlap, and a third overlapping region where the second irradiation light amount pattern and the third irradiation light amount pattern overlap.

An alignment pattern is formed based on the irradiation light pattern, and a photo-alignment film material layer 18 (refer to FIG. 3) becomes an alignment film (not shown). The irradiation light pattern and the alignment pattern are substantially the same pattern.

The first polarized light irradiating step, the second polarized light irradiating step, and the third polarized light irradiating step will be described in detail later. The first irradiation light amount pattern, the second irradiation light amount pattern, the third irradiation light amount pattern, and the irradiation light pattern will be described in detail later.

Hereinafter, a manufacturing device used for manufacturing an alignment film will be described.

(Manufacturing Device of Alignment Film)

Figure 3:
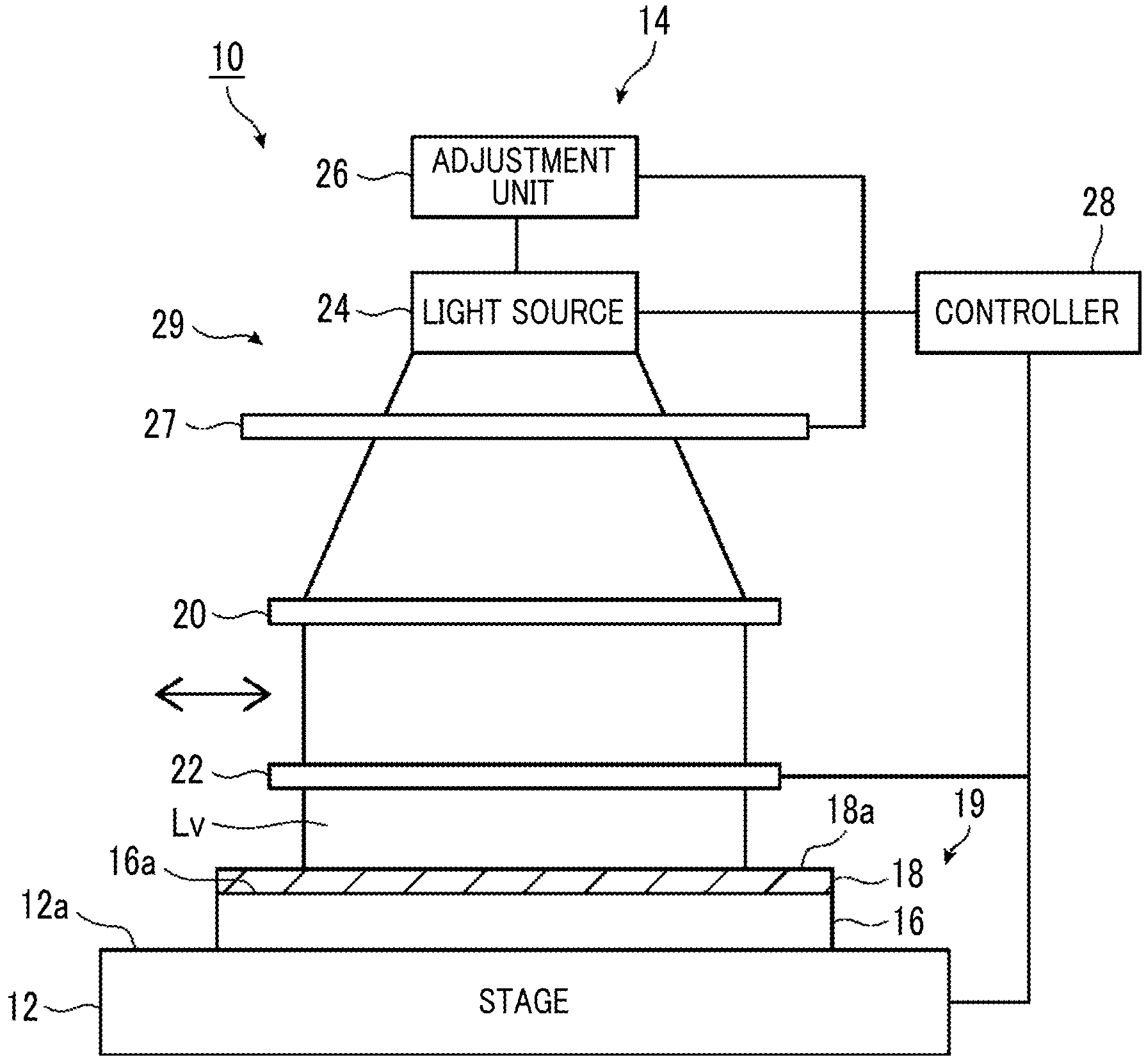
FIG. 3 is a schematic view showing an example of a manufacturing device of an alignment film according to the embodiment of the present invention.
Figure 4:
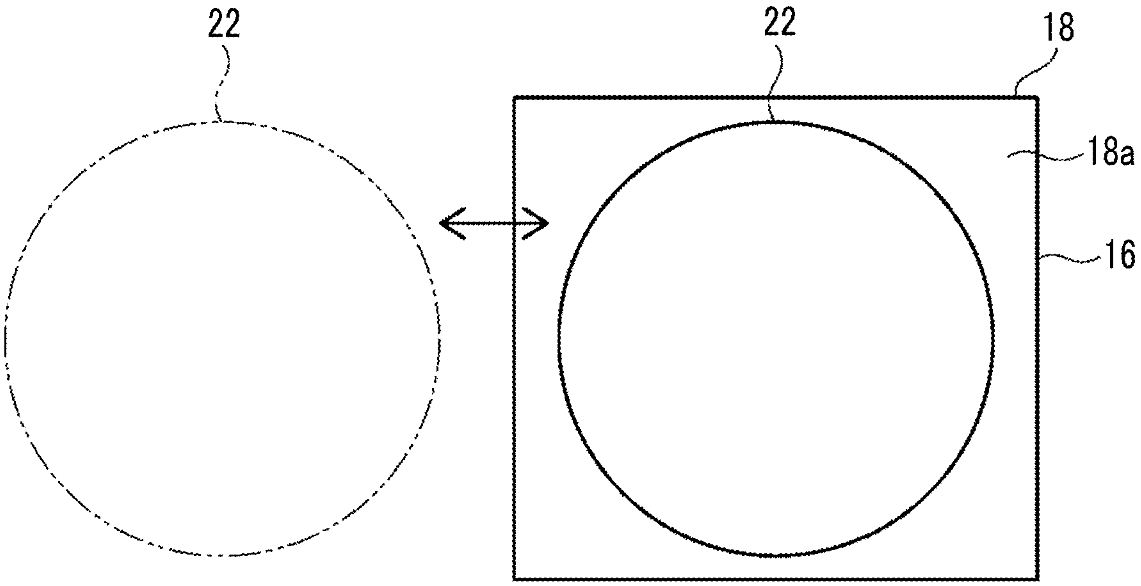
FIG. 4 is a schematic view showing a disposition of a mask in an example of the manufacturing device of an alignment film according to the embodiment of the present invention.

FIG. 3 is a schematic view showing an example of a manufacturing device of an alignment film according to the embodiment of the present invention, and FIG. 4 is a schematic view showing a disposition of a mask in the example of the manufacturing device of an alignment film according to the embodiment of the present invention.

A manufacturing device 10 of an alignment film shown in FIG. 3 is an example of a device used in the manufacturing method of an alignment film. The manufacturing method of an alignment film is not particularly limited to the use of the manufacturing device 10 shown in FIG. 3. The manufacturing device 10 can manufacture an alignment film having a fine pattern such as a geometrically complex pattern including, for example, a pattern in which the alignment direction is not parallel (non-parallel pattern described later) instead of a simple stripe pattern described later, or a pattern in which the alignment direction changes like a vortex (vortex alignment pattern described later) instead of a simple circular pattern.

The manufacturing device 10 has a stage 12, an irradiation unit 14 including a light source 24 and an adjustment unit 26, a polarizing plate 20, a mask 22, a shutter 27, and a controller 28. The operations of the stage 12, the irradiation unit 14, and the shutter 27 are controlled by the controller 28.

The light source 24 is disposed above a surface 12*a* of the stage 12. The shutter 27, the polarizing plate 20, and the mask 22 are disposed in this order from the light source 24 side between the stage 12 and the light source 24.

The stage 12 is for the placement of a laminate 19 in which the photo-alignment film material layer 18 is provided on a substrate 16. The laminate 19 is not in the form of a long sheet as wound around a roll, but is a single sheet-like body.

The stage 12 includes, for example, a moving mechanism (not shown). The moving mechanism enables the stage 12 to change the distance between the stage 12 and the light source 24 and also enables the stage 12 to move in two directions perpendicular to each other within the surface 12*a* of the stage 12.

The stage 12 may have a configuration without a moving mechanism. In this case, the stage 12 is in a state where the position is fixed without changing the position and is not controlled by the controller 28.

The irradiation unit 14 carries out the first polarized light irradiation, the second polarized light irradiation, and the third polarized light irradiation, each of which will be described later, in a state where the position of the laminate 19 placed on the stage 12 is fixed.

The polarizing plate 20 is an optical element that converts the light emitted from the irradiation unit 14 into linearly polarized light. The configuration of the polarizing plate 20 is not particularly limited as long as the polarizing plate 20 can change the polarization state of the light emitted from the irradiation unit 14 into linearly polarized light.

The polarizing plate 20 may be configured to be rotatable in a plane parallel to the surface 12*a* of the stage 12 by providing, for example, a rotating unit (not shown). The polarization direction of the linearly polarized light can be changed by rotating the polarizing plate 20.

In a case where the light source 24 can emit linearly polarized light, the polarizing plate 20 is not necessary.

The mask 22 is used for adjusting the intensity of light in the first polarized light irradiating step, the second polarized light irradiating step, and the third polarized light irradiating step. The mask 22 is disposed between the polarizing plate 20 and the laminate 19 and is spaced apart from a surface 18*a* of the photo-alignment film material layer 18.

The mask 22 is formed into a pattern corresponding to each of a first irradiation light amount pattern of the first polarized light irradiating step, a second irradiation light amount pattern of the second polarized light irradiating step, and a third irradiation light amount pattern of the third polarized light irradiating step.

With regard to the mask 22, different masks may be used in the first polarized light irradiating step, the second polarized light irradiating step, and the third polarized light irradiating step. In this case, the mask 22 is configured to be movable forward and backward with respect to the surface 18*a* of the photo-alignment film material layer 18, and as shown in FIG. 4, the mask 22 is withdrawn from the surface 18*a* of the photo-alignment film material layer 18 and replaced with another mask.

In addition, a rotating unit (not shown) may be provided in the mask 22 so that the mask 22 can be rotated in a plane parallel to the surface 12*a* of the stage 12, and then the mask 22 may be rotated in the first polarized light irradiating step, the second polarized light irradiating step, and the third polarized light irradiating step. In this case, the first polarized light irradiating step, the second polarized light irradiating step, and the third polarized light irradiating step can be carried out using one mask 22.

The mask 22 will be specifically described later.

Although the mask 22 is disposed to be spaced apart from the surface 18*a* of the photo-alignment film material layer 18 in FIG. 3, the present invention is not limited thereto. Since the laminate 19 is a single sheet-like body, for example, the first polarized light irradiating step, the second polarized light irradiating step, and the third polarized light irradiating step may be carried out by disposing the mask 22 in close contact with the surface 18*a* of the photo-alignment film material layer 18.

The above-mentioned rotating unit has, for example, a rotating mount (not shown) that holds and rotates the polarizing plate 20 or the mask 22, a motor (not shown) that rotates the rotating mount in a plane parallel to the surface 12*a* of the stage 12, and a detection unit (not shown) that detects an amount of rotation of the motor. The detection unit obtains rotation information of the polarizing plate 20 or the mask 22 such as the rotation amount, the rotational position, and the rotation speed. The detection unit has, for example, a rotary encoder. Based on the rotation information of the polarizing plate 20 or the mask 22 from the detection unit, the rotation amount of the motor of the rotating unit is controlled by the controller 28. In addition, the rotation speed of the motor of the rotating unit is also controlled by the controller 28.

In addition, the rotating unit is not particularly limited, and may be configured to have a stepping motor. For example, it is possible to use a stepping motor that does not have an encoder and adopts an open-loop control in which an origin detection is carried out using a clockwise (CW) limit sensor.

The shutter 27 blocks the light emitted from the light source 24 of the irradiation unit 14. The shutter 27 is, for example, movable forward and backward between the light source 24 and the polarizing plate 20, and has an area larger than that of the polarizing plate 20. The shutter 27 is composed of, for example, a plate with a small amount of transmitted light of light emitted from the light source 24. The plate with a small amount of transmitted light is, for example, a metal plate.

The amount of the light transmitted through the shutter 27 is not particularly limited as long as it is an amount of light with which the photo-alignment film material layer 18 to be exposed is not exposed. The amount of the transmitted light is preferably small and most preferably zero.

The shutter 27 has an opening and closing portion (not shown) that moves the shutter 27 forward and backward between the light source 24 and the polarizing plate 20. The opening and closing portion is controlled by the controller 28. The opening and closing portion of the shutter 27 is driven by the controller 28 to move the shutter 27 forward and backward between the light source 24 and the polarizing plate 20. The opening and closing portion is not particularly limited, and examples of the opening and closing portion include one that rotates the shutter 27 to enter or retract, and one that moves the shutter 27 in one direction between the light source 24 and the polarizing plate 20 to enter or retract.

In a state where the shutter 27 is retracted from between the light source 24 and the polarizing plate 20, the light emitted from the light source 24 is incident on the polarizing plate 20. That is, a state where exposure can be carried out is established. On the other hand, in a state where the shutter 27 has entered between the light source 24 and the polarizing plate 20, the light emitted from the light source 24 is blocked, the amount of light incident on the polarizing plate 20 is small, and therefore the photo-alignment film material layer 18 cannot be exposed to light.

The irradiation unit 14 carries out first polarized light irradiation, second polarized light irradiation, and third polarized light irradiation on the photo-alignment film material layer 18 of the laminate 19.

The irradiation unit 14 has the light source 24 and the adjustment unit 26 as described above. The irradiation unit 14 further has the polarizing plate 20 and the mask 22. A collimator lens (not shown) may be disposed between the light source 24 and the polarizing plate 20.

The light source 24 emits light used for forming an alignment film. The light source 24 emits, for example, light having a wavelength at which the photo-alignment material contained in the photo-alignment film material layer 18 has photosensitivity. In a case where the photo-alignment film material layer 18 has photosensitivity to ultraviolet rays, for example, a metal halide lamp that emits ultraviolet rays is used as the light source 24. Here, the ultraviolet rays refer to light having a wavelength of 250 to 430 nm.

Linearly polarized light is obtained by the light source 24 and the polarizing plate 20. The intensity of the linearly polarized light can be changed by changing the amount of light emitted from the light source 24.

The light source 24, the polarizing plate 20, and the mask 22 constitute a light source unit 29 that emits linearly polarized light in a first polarization direction, linearly polarized light in a second polarization direction, and linearly polarized light in a third polarization direction onto the photo-alignment film material layer 18 of the laminate.

The light emitted from the light source 24 is converted into linearly polarized light by conversion of its polarization state by the polarizing plate 20, is passed through the mask 22, and is applied as irradiation light Lv onto the surface 18*a* of the photo-alignment film material layer 18.

The adjustment unit 26 adjusts the light source unit 29 such that the intensity of the linearly polarized light in the first polarization direction forms a first irradiation light amount pattern on the photo-alignment film material layer 18 provided on the substrate 16, adjusts the light source unit 29 such that the intensity of the linearly polarized light in the second polarization direction forms a second irradiation light amount pattern on the photo-alignment film material layer 18 provided on the substrate 16, and adjusts the light source unit 29 such that the intensity of the linearly polarized light in the third polarization direction forms a third irradiation light amount pattern on the photo-alignment film material layer 18 provided on the substrate 16.

The adjustment unit 26 is connected to the light source 24 and controls the on/off, light amount, and the like of the light source 24, thereby controlling the light source unit 29 to produce the first irradiation light amount pattern, the second irradiation light amount pattern, and the third irradiation light amount pattern as described above. The adjustment unit 26 is controlled by the controller 28.

Next, the mask will be described.

Figure 5:
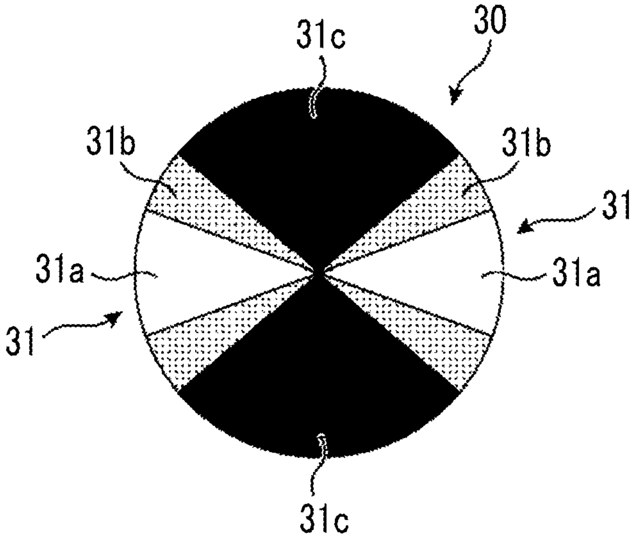
FIG. 5 is a schematic view showing an example of a first mask used in a manufacturing method of an alignment film according to the embodiment of the present invention.
Figure 6:
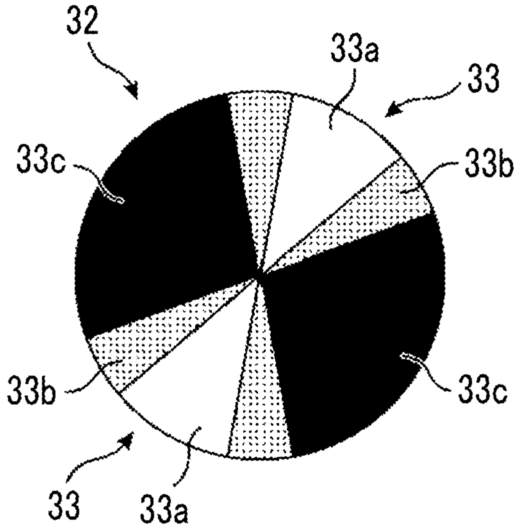
FIG. 6 is a schematic view showing an example of a second mask used in the manufacturing method of an alignment film according to the embodiment of the present invention.
Figure 7:
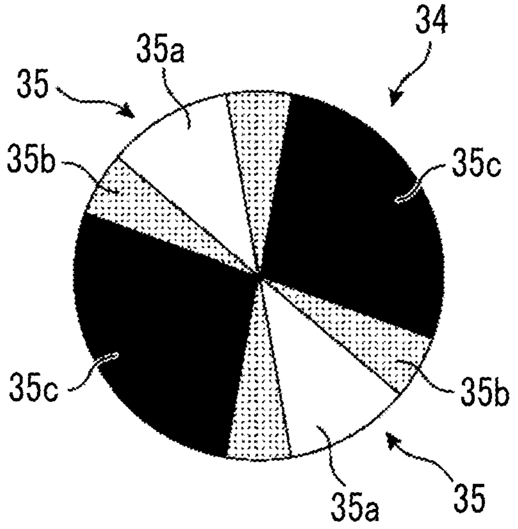
FIG. 7 is a schematic view showing an example of a third mask used in the manufacturing method of an alignment film according to the embodiment of the present invention.

FIG. 5 is a schematic view showing an example of a first mask used in the manufacturing method of an alignment film according to the embodiment of the present invention, FIG. 6 is a schematic view showing an example of a second mask used in the manufacturing method of an alignment film according to the embodiment of the present invention, and FIG. 7 is a schematic view showing an example of a third mask used in the manufacturing method of an alignment film according to the embodiment of the present invention.

A first mask 30 shown in FIG. 5 is used, for example, in the first polarized light irradiating step, a second mask 32 shown in FIG. 6 is used, for example, in the second polarized light irradiating step, and a third mask 34 shown in FIG. 7 is used, for example, in the third polarized light irradiating step.

The first mask 30 shown in FIG. 5, the second mask 32 shown in FIG. 6, and the third mask 34 shown in FIG. 7 all have a circular outer shape and the same diameter.

The first mask 30 shown in FIG. 5 has, for example, a plurality of light transmitting portions 31 and a plurality of light shielding portions 31*c*. The light transmitting portion 31 has regions having different transmittances, and has a region 31*a* having a high transmittance and a region 31*b* having a low transmittance. The number of regions having different transmittances in the light transmitting portion 31 is not particularly limited and is appropriately determined depending on the alignment pattern formed on the alignment film.

The first mask 30 adjusts the intensity of light on the photo-alignment film material layer 18 provided on the substrate 16 to obtain a first irradiation light amount pattern. The linearly polarized light in the first polarization direction that has transmitted through the first mask 30 is applied as irradiation light Lv (refer to FIG. 3) onto the surface 18*a* of the photo-alignment film material layer 18 corresponding to the light transmitting portion 31, exposing the photo-alignment film material layer 18 to form a first irradiation light amount pattern on the surface 18*a* of the photo-alignment film material layer 18.

The second mask 32 has the same configuration as the first mask 30 and is obtained by rotating the first mask 30 counterclockwise by 60°. The second mask 32 has, for example, a plurality of light transmitting portions 33 and a plurality of light shielding portions 33*c*. The light transmitting portion 33 has regions having different transmittances, and has a region 33*a* having a high transmittance and a region 33*b* having a low transmittance.

The second mask 32 adjusts the intensity of light on the photo-alignment film material layer 18 provided on the substrate 16 to obtain a second irradiation light amount pattern. The linearly polarized light in the second polarization direction that has transmitted through the second mask 32 is applied as irradiation light Lv (refer to FIG. 3) onto the surface 18*a* of the photo-alignment film material layer 18 corresponding to the light transmitting portion 33, exposing the photo-alignment film material layer 18 to form a second irradiation light amount pattern on the surface 18*a* of the photo-alignment film material layer 18.

The third mask 34 has the same configuration as the first mask 30 and is obtained by rotating the first mask 30 counterclockwise by 120°. The third mask 34 has, for example, a plurality of light transmitting portions 35 and a plurality of light shielding portions 35*c*. The light transmitting portion 35 has regions having different transmittances, and has a region 35*a* having a high transmittance and a region 35*b* having a low transmittance.

The third mask 34 adjusts the intensity of light on the photo-alignment film material layer 18 provided on the substrate 16 to obtain a third irradiation light amount pattern. The linearly polarized light in the third polarization direction that has transmitted through the third mask 34 is applied as irradiation light Lv (refer to FIG. 3) onto the surface 18*a* of the photo-alignment film material layer 18 corresponding to the light transmitting portion 35, exposing the photo-alignment film material layer 18 to form a third irradiation light amount pattern on the surface 18*a* of the photo-alignment film material layer 18.

The first mask 30 shown in FIG. 5, the second mask 32 shown in FIG. 6, and the third mask 34 shown in FIG. 7 are referred to as mask patterns having regions with different transmittances. In addition, the transmittance is a transmittance for the light emitted from the light source 24.

The first mask 30 shown in FIG. 5, the second mask 32 shown in FIG. 6, and the third mask 34 shown in FIG. 7 all have a circular outer shape, but the outer shape of the mask is not limited thereto and can be set to any outer shape according to the alignment pattern to be formed.

In addition, the first mask 30, the second mask 32, and the third mask 34 may be configured such that the mask is formed on a support (not shown) having a quadrangular outer shape, for example.

The configuration of the mask is not particularly limited as long as the mask has a light transmitting portion and a light shielding portion. The mask may have, for example, a configuration in which a liquid crystal layer capable of changing the amount of transmitted light is provided. The liquid crystal layer can be used as the mask by displaying, on the liquid crystal layer, a pattern corresponding to the alignment pattern formed on the alignment film.

In addition, for example, a mask in which a fine halftone dot pattern formed of a material that shields or reflects light having a wavelength used for exposure is provided on a glass or resin plate and an exposure amount is adjusted by an opening ratio of the halftone dots can be used as the first mask 30, the second mask 32, and the third mask 34. In addition to this, for example, a mask in which the amount of transmitted light is adjusted by including a predetermined amount of a dye or pigment that absorbs light having a wavelength used for exposure in a resin plate and adjusting the content of the dye or pigment can be used as the first mask 30, the second mask 32, and the third mask 34. In addition, a mask in which the amount of transmitted light is adjusted by providing a layer containing a dye or pigment that absorbs light having a wavelength used for exposure on a glass or resin plate and adjusting the content of the dye or pigment or the thickness of the above-mentioned layer can also be used as the first mask 30, the second mask 32, and the third mask 34.

Figure 8:
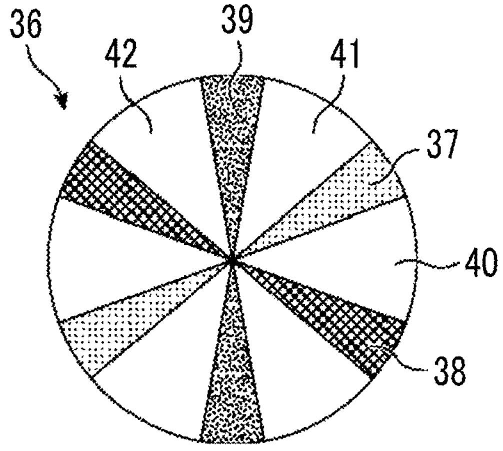
FIG. 8 is a schematic view showing an example of an irradiation light pattern used in the manufacturing method of an alignment film according to the embodiment of the present invention.

Here, FIG. 8 is a schematic view showing an example of an irradiation light pattern used in the manufacturing method of an alignment film according to the embodiment of the present invention.

For example, in a case where the center of the first mask 30 shown in FIG. 5, the center of the second mask 32 shown in FIG. 6, and the center of the third mask 34 shown in FIG. 7 are aligned, and the first irradiation light amount pattern formed by the first mask 30, the second irradiation light amount pattern formed by the second mask 32, and the third irradiation light amount pattern formed by the third mask 34 are superimposed on one another, an irradiation light pattern 36 shown in FIG. 8 is formed on the surface 18*a* of the photo-alignment film material layer 18.

The irradiation light pattern 36 shown in FIG. 8 has at least a first overlapping region 37 where the first irradiation light amount pattern and the second irradiation light amount pattern overlap, a second overlapping region 38 where the first irradiation light amount pattern and the third irradiation light amount pattern overlap, and a third overlapping region 39 where the second irradiation light amount pattern and the third irradiation light amount pattern overlap.

In the manufacturing device 10, the adjustment unit 26 adjusts, for example, the intensity of light emitted from the light source 24 such that the irradiation light pattern 36 shown in FIG. 8 has at least the first overlapping region 37 where the first irradiation light amount pattern and the second irradiation light amount pattern overlap, the second overlapping region 38 where the first irradiation light amount pattern and the third irradiation light amount pattern overlap, and the third overlapping region 39 where the second irradiation light amount pattern and the third irradiation light amount pattern overlap.

In the irradiation light pattern 36 shown in FIG. 8, the first overlapping region 37 and the second overlapping region 38 are connected by a first connection region 40 to which only the linearly polarized light in the first polarization direction is applied. In addition, the first overlapping region 37 and the third overlapping region 39 are connected by a second connection region 41 to which only the linearly polarized light in the second polarization direction is applied. The second overlapping region 38 and the third overlapping region 39 are connected by a third connection region 42 to which only the linearly polarized light in the third polarization direction is applied.

The first connection region 40 corresponds to, for example, the region 31*a* having a high transmittance in the first mask 30. The second connection region 41 corresponds to, for example, the region 33*a* having a high transmittance in the second mask 32. The third connection region 42 corresponds to, for example, the region 35*a* having a high transmittance in the third mask 34.

In addition, in the irradiation light pattern 36, the first irradiation light amount pattern has a maximal value of an irradiation light amount in the first connection region 40, the second irradiation light amount pattern has a maximal value of an irradiation light amount in the second connection region 41, and the third irradiation light amount pattern has a maximal value of an irradiation light amount in the third connection region 42.

The first connection region 40, the second connection region 41, and the third connection region 42 are regions that are irradiated only once through the first polarized light irradiating step, the second polarized light irradiating step, and the third polarized light irradiating step, respectively, so the amounts of irradiation light in the first connection region 40, the second connection region 41, and the third connection region 42 are smaller than those of the other regions. Therefore, in order to secure the amount of irradiation light, the intensity of light in the first irradiation light amount pattern, the intensity of light in the second irradiation light amount pattern, and the intensity of light in the third irradiation light amount pattern are adjusted so that the first connection region 40, the second connection region 41, and the third connection region 42 each have a maximal value of the amount of irradiation light. With regard to the intensity of light, for example, the transmittance of the mask is increased to increase the intensity of light and increase the amount of irradiation light Lv.

(First Example of Manufacturing Method of Alignment Film)

Figure 9:
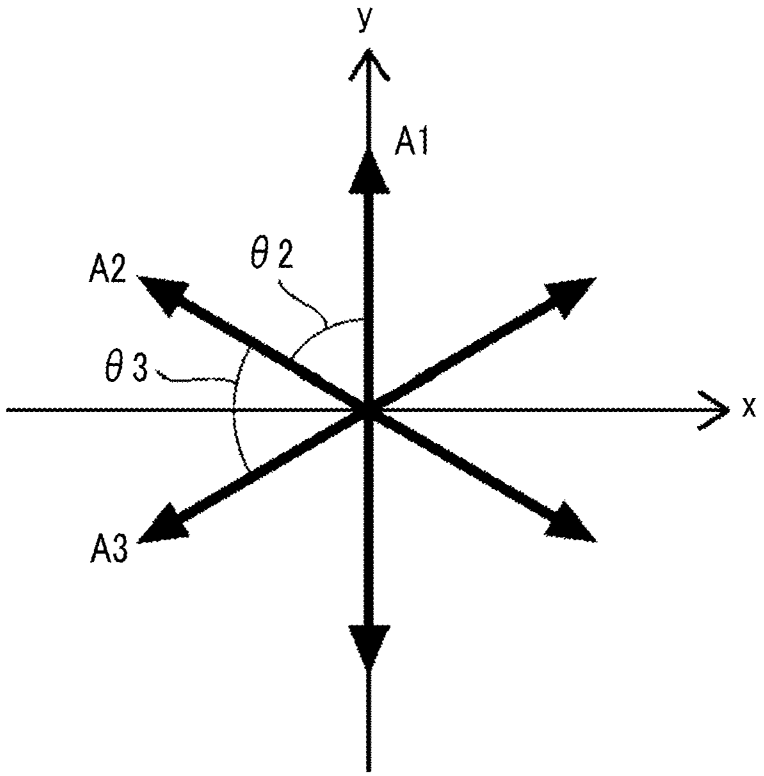
FIG. 9 is a schematic view showing a first example of a polarization direction of linearly polarized light used in the manufacturing method of an alignment film according to the embodiment of the present invention.
Figure 10:
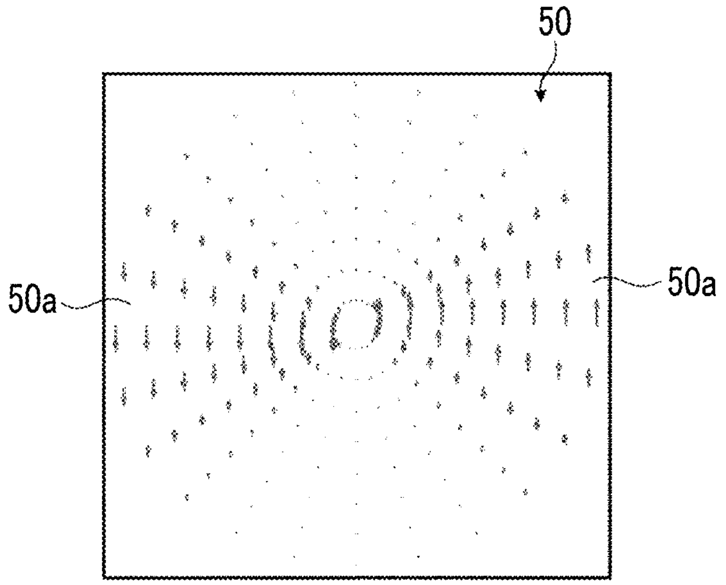
FIG. 10 is a schematic view showing a first example of a first irradiation light amount pattern used in the manufacturing method of an alignment film according to the embodiment of the present invention.
Figure 11:
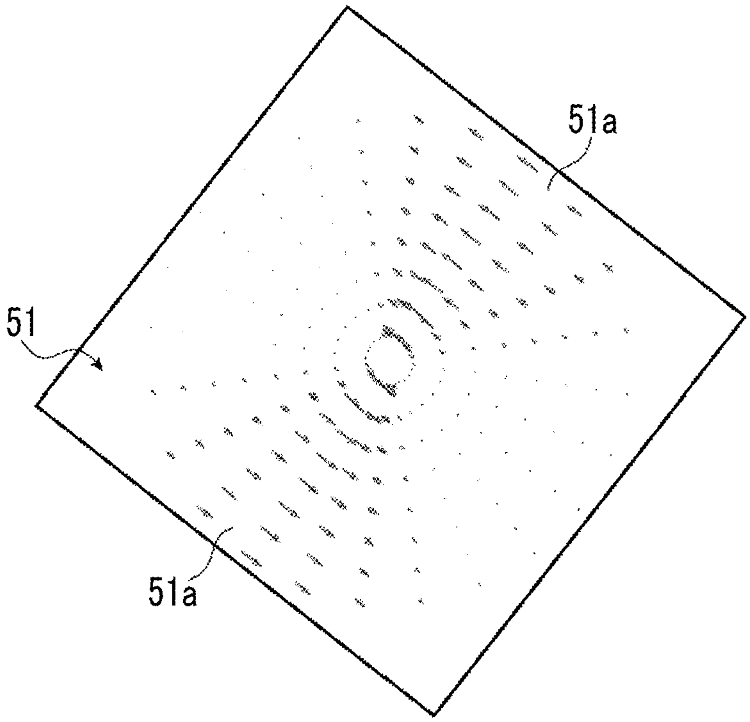
FIG. 11 is a schematic view showing a first example of a second irradiation light amount pattern used in the manufacturing method of an alignment film according to the embodiment of the present invention.
Figure 12:
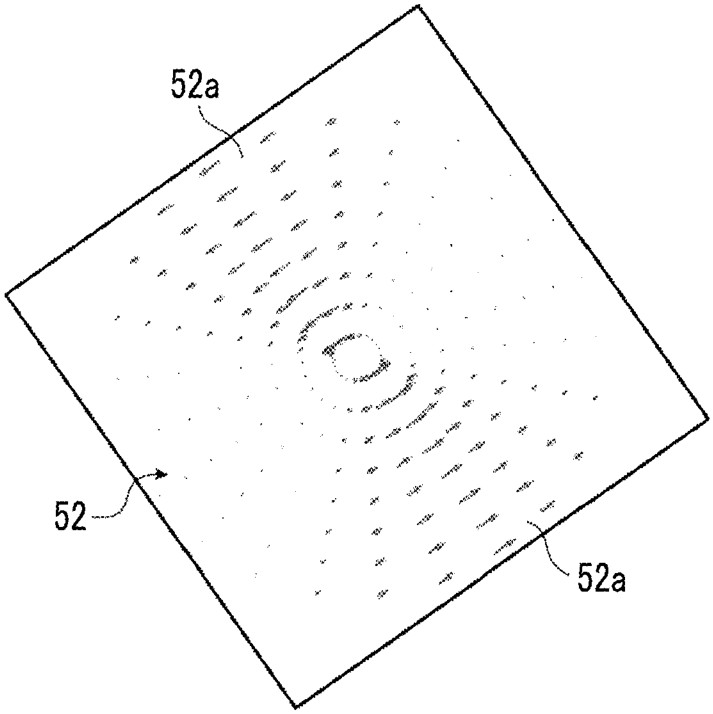
FIG. 12 is a schematic view showing a first example of a third irradiation light amount pattern used in the manufacturing method of an alignment film according to the embodiment of the present invention.
Figure 13:
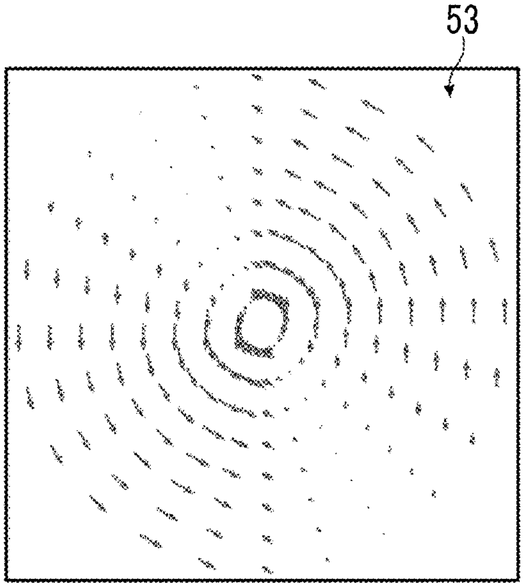
FIG. 13 is a schematic view showing an exposure pattern formed by the first irradiation light amount pattern and the second irradiation light amount pattern.
Figure 14:
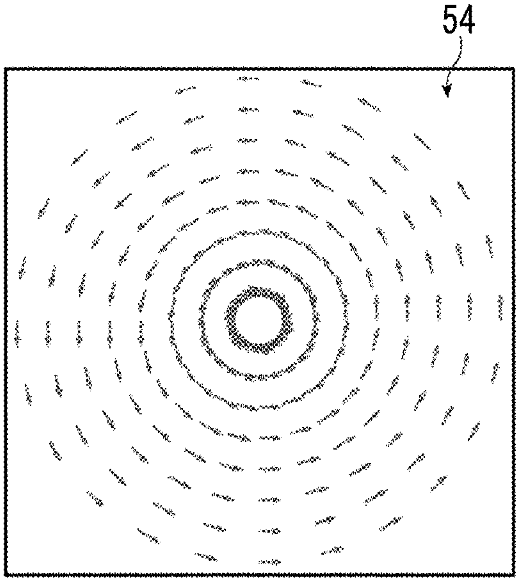
FIG. 14 is a schematic view showing an irradiation light pattern formed by the first irradiation light amount pattern, the second irradiation light amount pattern, and the third irradiation light amount pattern.

FIG. 9 is a schematic view showing a first example of a polarization direction of linearly polarized light used in the manufacturing method of an alignment film according to the embodiment of the present invention. FIG. 10 is a schematic view showing a first example of a first irradiation light amount pattern used in the manufacturing method of an alignment film according to the embodiment of the present invention, and FIG. 11 is a schematic view showing a first example of a second irradiation light amount pattern used in the manufacturing method of an alignment film according to the embodiment of the present invention. FIG. 12 is a schematic view showing a first example of a third irradiation light amount pattern used in the manufacturing method of an alignment film according to the embodiment of the present invention. FIG. 13 is a schematic view showing an exposure pattern formed by the first irradiation light amount pattern and the second irradiation light amount pattern, and FIG. 14 is a schematic view showing an irradiation light pattern formed by the first irradiation light amount pattern, the second irradiation light amount pattern, and the third irradiation light amount pattern.

The manufacturing method of an alignment film has a first polarized light irradiating step, a second polarized light irradiating step, and a third polarized light irradiating step that are carried out on the photo-alignment film material layer 18 provided on the substrate 16 as described later. However, a photo-alignment film material layer forming step of providing a photo-alignment film material on the substrate 16 to form the photo-alignment film material layer 18 may be provided prior to the first polarized light irradiating step. The step of forming the photo-alignment film material layer 18 is not particularly limited. For example, the photo-alignment film material is applied onto the surface 16*a* of the substrate 16 and dried to form the photo-alignment film material layer 18. Any known method can be appropriately used for forming the photo-alignment film material layer 18.

The manufacturing method of an alignment film has a first polarized light irradiating step, a second polarized light irradiating step, and a third polarized light irradiating step that are carried out on the photo-alignment film material layer 18 provided on the substrate 16.

The first polarization direction of the linearly polarized light used in the first polarized light irradiating step is defined as θ1 (not shown). In this case, the direction of the linearly polarized light is A1.

The second polarization direction of the linearly polarized light used in the second polarized light irradiating step is defined as θ2. In this case, the direction of the linearly polarized light is A2.

The third polarization direction of the linearly polarized light used in the third polarized light irradiating step is defined as θ3. In this case, the direction of the linearly polarized light is A3.

As shown in FIG. 9, the first polarization direction θ1 is set to 0° as a reference, the second polarization direction θ2 is set to 60°, and the third polarization direction θ3 is set to 60°. In this case, θ3+θ2>90°.

The first polarized light irradiating step, the second polarized light irradiating step, and the third polarized light irradiating step are carried out in a state where the position of the laminate 19 in which the photo-alignment film material layer 18 is provided on the substrate 16 is fixed. In this case, a state where the position of the stage 12 and the relative position of the stage 12 to the mask 22 are fixed is established.

Since the first polarized light irradiating step, the second polarized light irradiating step, and the third polarized light irradiating step described later are carried out on the photo-alignment film material layer 18 provided on the substrate 16, the photo-alignment film material layer 18 formed on the substrate 16 may be prepared in advance and used.

A first example of the manufacturing method of an alignment film is an example in which a concentric alignment pattern is formed on the photo-alignment film material layer 18 (refer to FIG. 3) provided on the substrate 16 (refer to FIG. 3). In a case of forming the concentric alignment pattern, first, the first mask 30 shown in FIG. 5 is disposed on the photo-alignment film material layer 18.

Next, in a state where the shutter 27 (refer to FIG. 3) is retracted from between the light source 24 (refer to FIG. 3) and the polarizing plate 20 (refer to FIG. 3), light is emitted from the light source 24 (refer to FIG. 3) of the irradiation unit 14 (refer to FIG. 3), and the linearly polarized light in the first polarization direction, which has been passed through the polarizing plate 20 to convert the polarization state into linear polarization, is made incident on the first mask 30.

The first polarized light irradiating step is carried out in such a manner that the photo-alignment film material layer 18 is irradiated with the linearly polarized light in the first polarization direction, which has been transmitted through the first mask 30, in a state where the intensity of light is adjusted to obtain a first irradiation light amount pattern 50 shown in FIG. 10 on the photo-alignment film material layer 18.

The direction of the arrow shown in FIG. 10 to FIG. 14 indicates the direction of alignment, and the length of the arrow indicates the intensity of light. The longer the arrow, the larger the amount of irradiation light, that is, the larger the amount of exposure light.

In the first irradiation light amount pattern 50, there is a region 50*a* with a long arrow, and the region 50*a* corresponds to the first connection region 40 shown in FIG. 8.

Next, in a state where the shutter 27 is allowed to enter between the light source 24 and the polarizing plate 20, the first mask 30 shown in FIG. 5 is replaced with the second mask 32 shown in FIG. 6 and the second mask 32 shown in FIG. 6 is disposed on the photo-alignment film material layer 18.

Next, for example, the polarizing plate 20 is adjusted such that the linearly polarized light is set to be in the second polarization direction θ2.

Next, in a state where the shutter 27 is retracted from between the light source 24 and the polarizing plate 20, light is emitted from the light source 24 of the irradiation unit 14, and the linearly polarized light in the second polarization direction, which has been passed through the polarizing plate 20 to convert the polarization state into linear polarization, is made incident on the second mask 32.

The second polarized light irradiating step is carried out in such a manner that the photo-alignment film material layer 18 is irradiated with the linearly polarized light in the second polarization direction, which has been transmitted through the second mask 32, in a state where the intensity of light is adjusted to obtain a second irradiation light amount pattern 51 shown in FIG. 11 on the photo-alignment film material layer 18.

In the second irradiation light amount pattern 51, there is a region 51*a* with a long arrow, and the region 51*a* corresponds to the second connection region 41 shown in FIG. 8.

Next, in a state where the shutter 27 is allowed to enter between the light source 24 and the polarizing plate 20, the second mask 32 shown in FIG. 6 is replaced with the third mask 34 shown in FIG. 7 and the third mask 34 shown in FIG. 7 is disposed on the photo-alignment film material layer 18.

Next, for example, the polarizing plate 20 is adjusted such that the linearly polarized light is set to be in the third polarization direction θ3.

Next, in a state where the shutter 27 is retracted from between the light source 24 and the polarizing plate 20, light is emitted from the light source 24 of the irradiation unit 14, and the linearly polarized light in the third polarization direction, which has been passed through the polarizing plate 20 to convert the polarization state into linear polarization, is made incident on the third mask 34.

The third polarized light irradiating step is carried out in such a manner that the photo-alignment film material layer 18 is irradiated with the linearly polarized light in the third polarization direction, which has been transmitted through the third mask 34, in a state where the intensity of light is adjusted to obtain a third irradiation light amount pattern 52 shown in FIG. 12 on the photo-alignment film material layer 18.

In the third irradiation light amount pattern 52, there is a region 52*a* with a long arrow, and the region 52*a* corresponds to the third connection region 42 shown in FIG. 8.

An exposure pattern 53 shown in FIG. 13 is formed on the photo-alignment film material layer 18 by the first irradiation light amount pattern 50 and the second irradiation light amount pattern 51. That is, after the first polarized light irradiating step and the second polarized light irradiating step, the exposure pattern 53 shown in FIG. 13 is formed on the photo-alignment film material layer 18.

A concentric irradiation light pattern 54 is formed on the photo-alignment film material layer 18 as shown in FIG. 14 by the first irradiation light amount pattern 50, the second irradiation light amount pattern 51, and the third irradiation light amount pattern 52. That is, the concentric irradiation light pattern 54 shown in FIG. 14 is formed on the surface 18*a* of the photo-alignment film material layer 18 by carrying out three polarized light irradiating steps of the first polarized light irradiating step to the third polarized light irradiating step. This makes it possible to form an alignment film having a concentric alignment pattern (not shown), which then makes it possible to manufacture an alignment film having a fine pattern such as a geometrically complex pattern like the above-mentioned concentric alignment pattern.

In the above-mentioned first polarized light irradiating step, the first polarized light irradiation carried out by the irradiation unit 14 (refer to FIG. 3) is the irradiation of the photo-alignment film material layer 18 with the linearly polarized light in the first polarization direction, the intensity of the linearly polarized light being adjusted to obtain the first irradiation light amount pattern, as irradiation light Lv (refer to FIG. 3), on the photo-alignment film material layer 18 (refer to FIG. 3) provided on the substrate 16 (refer to FIG. 3).

In addition, in the second polarized light irradiating step, the second polarized light irradiation carried out by the irradiation unit 14 is the irradiation of the photo-alignment film material layer 18 with the linearly polarized light in the second polarization direction, the intensity of the linearly polarized light being adjusted to obtain the second irradiation light amount pattern, as irradiation light Lv, on the photo-alignment film material layer 18 provided on the substrate 16.

In addition, in the third polarized light irradiating step, the third polarized light irradiation carried out by the irradiation unit 14 is the irradiation of the photo-alignment film material layer 18 with the linearly polarized light in the third polarization direction, the intensity of the linearly polarized light being adjusted to obtain the third irradiation light amount pattern, as irradiation light Lv, on the photo-alignment film material layer 18 provided on the substrate 16.

(Second Example of Manufacturing Method of Alignment Film)

Figure 15:
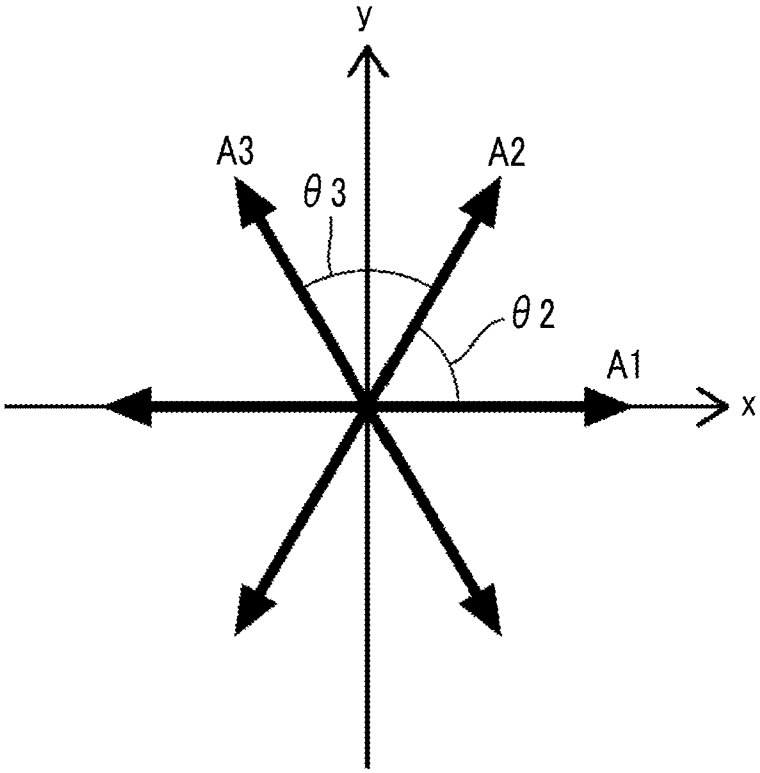
FIG. 15 is a schematic view showing a second example of the polarization direction of linearly polarized light used in the manufacturing method of an alignment film according to the embodiment of the present invention.
Figure 16:
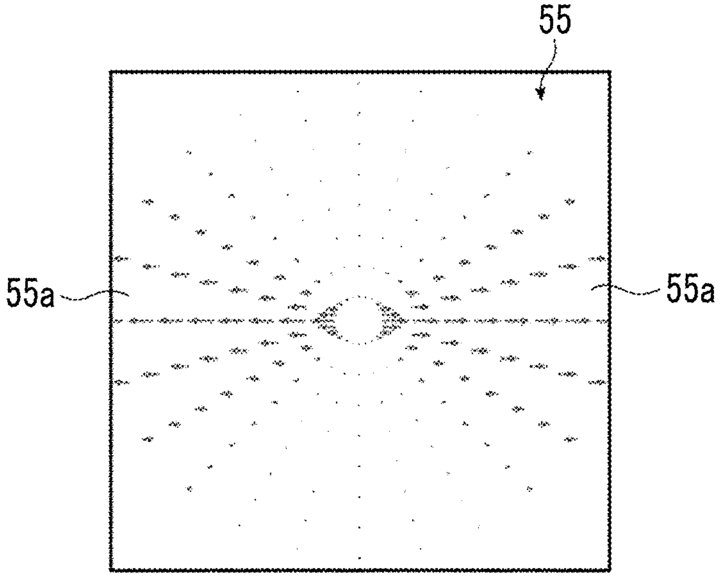
FIG. 16 is a schematic view showing a second example of the first irradiation light amount pattern used in the manufacturing method of an alignment film according to the embodiment of the present invention.
Figure 17:
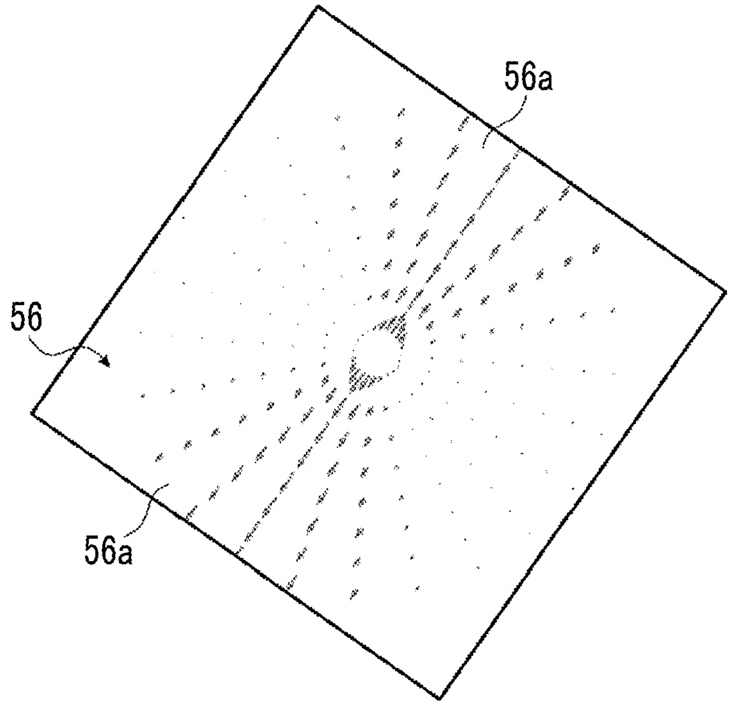
FIG. 17 is a schematic view showing a first example of the second irradiation light amount pattern used in the manufacturing method of an alignment film according to the embodiment of the present invention.
Figure 18:
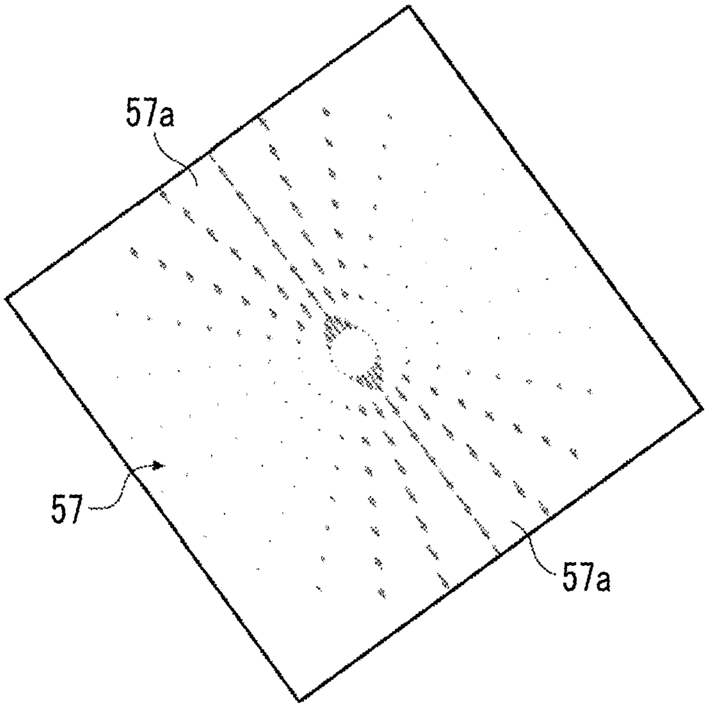
FIG. 18 is a schematic view showing a second example of the third irradiation light amount pattern used in the manufacturing method of an alignment film according to the embodiment of the present invention.

FIG. 15 is a schematic view showing a second example of the polarization direction of linearly polarized light used in the manufacturing method of an alignment film according to the embodiment of the present invention. FIG. 16 is a schematic view showing a second example of the first irradiation light amount pattern used in the manufacturing method of an alignment film according to the embodiment of the present invention. FIG. 17 is a schematic view showing a first example of a second irradiation light amount pattern used in the manufacturing method of an alignment film according to the embodiment of the present invention, and FIG. 18 is a schematic view showing a second example of the third irradiation light amount pattern used in the manufacturing method of an alignment film according to the embodiment of the present invention.

Figure 19:
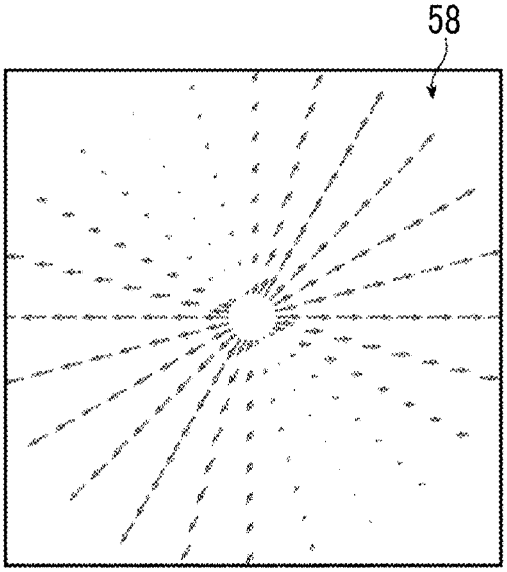
FIG. 19 is a schematic view showing an exposure pattern formed by the first irradiation light amount pattern and the second irradiation light amount pattern.
Figure 20:
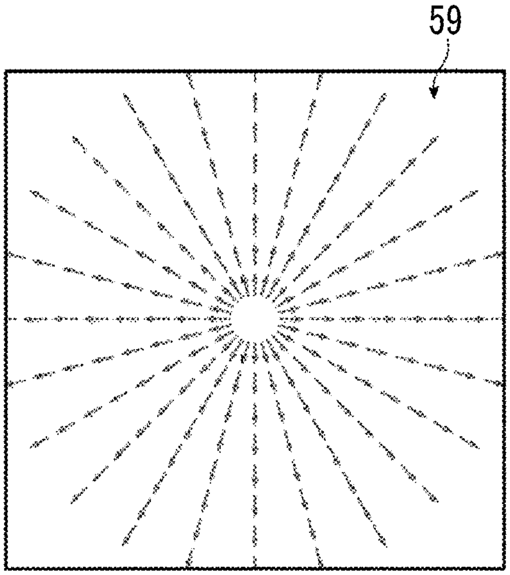
FIG. 20 is a schematic view showing an irradiation light pattern formed by the first irradiation light amount pattern, the second irradiation light amount pattern, and the third irradiation light amount pattern.

FIG. 19 is a schematic view showing an exposure pattern formed by the first irradiation light amount pattern and the second irradiation light amount pattern. FIG. 20 is a schematic view showing an irradiation light pattern formed by the first irradiation light amount pattern, the second irradiation light amount pattern, and the third irradiation light amount pattern.

The direction of the arrow shown in FIG. 16 to FIG. 20 indicates the direction of alignment, and the length of the arrow indicates the intensity of light. The longer the arrow, the larger the amount of irradiation light, that is, the larger the amount of exposure light.

A second example of the manufacturing method of an alignment film is an example in which a radial alignment pattern is formed on the photo-alignment film material layer 18 (refer to FIG. 3) provided on the substrate 16 (refer to FIG. 3).

The first polarization direction θ1, the second polarization direction θ2, and the third polarization direction θ3 are the directions shown in FIG. 15. In addition, the directions A1 to A3 of the linearly polarized light are also the directions shown in FIG. 15. The first mask 30 shown in FIG. 5 is used in the first polarized light irradiating step, the second mask 32 shown in FIG. 6 is used in the second polarized light irradiating step, and the third mask 34 shown in FIG. 7 is used in the third polarized light irradiating step.

In the second example of the manufacturing method of an alignment film, the same steps as those in the first example of the manufacturing method of an alignment film described above are carried out except that the first polarization direction θ1, the second polarization direction θ2, and the third polarization direction θ3 are set to the directions shown in FIG. 15, and the directions A1 to A3 of the linearly polarized light are set to the directions shown in FIG. 15, as compared with the first example of the manufacturing method of an alignment film described above.

In the second example of the manufacturing method of an alignment film, the first mask 30 shown in FIG. 5 is disposed on the photo-alignment film material layer 18 in the first polarized light irradiating step. Light emitted from the light source 24 (refer to FIG. 3) is passed through the polarizing plate 20 to convert the polarization state into linear polarization, thereby obtaining the linearly polarized light in the first polarization direction. Then, the linearly polarized light in the first polarization direction is made incident on the first mask 30.

The first polarized light irradiating step is carried out in such a manner that the photo-alignment film material layer 18 is irradiated with the linearly polarized light in the first polarization direction, which has been transmitted through the first mask 30, in a state where the intensity of light is adjusted to obtain a first irradiation light amount pattern 55 shown in FIG. 16 on the photo-alignment film material layer 18.

In the first irradiation light amount pattern 55, there is a region 55*a* with a long arrow, and the region 55*a* corresponds to the first connection region 40 shown in FIG. 8.

In the second polarized light irradiating step, the second mask 32 shown in FIG. 6 is disposed on the photo-alignment film material layer 18. Light emitted from the light source 24 (refer to FIG. 3) is passed through the polarizing plate 20 to convert the polarization state into linear polarization, thereby obtaining the linearly polarized light in the second polarization direction. Then, the linearly polarized light in the second polarization direction is made incident on the second mask 32.

The second polarized light irradiating step is carried out in such a manner that the photo-alignment film material layer 18 is irradiated with the linearly polarized light in the second polarization direction, which has been transmitted through the second mask 32, in a state where the intensity of light is adjusted to obtain a second irradiation light amount pattern 56 shown in FIG. 17 on the photo-alignment film material layer 18.

In the second irradiation light amount pattern 56, there is a region 56*a* with a long arrow, and the region 56*a* corresponds to the second connection region 41 shown in FIG. 8.

In the third polarized light irradiating step, the third mask 34 shown in FIG. 7 is disposed on the photo-alignment film material layer 18. Light emitted from the light source 24 (refer to FIG. 3) is passed through the polarizing plate 20 to convert the polarization state into linear polarization, thereby obtaining the linearly polarized light in the third polarization direction. Then, the linearly polarized light in the third polarization direction is made incident on the third mask 34.

The third polarized light irradiating step is carried out in such a manner that the photo-alignment film material layer 18 is irradiated with the linearly polarized light in the third polarization direction, which has been transmitted through the third mask 34, in a state where the intensity of light is adjusted to obtain a third irradiation light amount pattern 57 shown in FIG. 18 on the photo-alignment film material layer 18.

In the third irradiation light amount pattern 57, there is a region 57*a* with a long arrow, and the region 57*a* corresponds to the third connection region 42 shown in FIG. 8.

An exposure pattern 58 shown in FIG. 19 is formed on the photo-alignment film material layer 18 by the first irradiation light amount pattern 55 and the second irradiation light amount pattern 56. That is, after the first polarized light irradiating step and the second polarized light irradiating step, the exposure pattern 58 shown in FIG. 19 is formed on the photo-alignment film material layer 18.

A radial irradiation light pattern 59 is formed, as shown in FIG. 20, by the first irradiation light amount pattern 55, the second irradiation light amount pattern 56, and the third irradiation light amount pattern 57. That is, the radial irradiation light pattern 59 shown in FIG. 20 is formed on the surface 18*a* of the photo-alignment film material layer 18 by carrying out three polarized light irradiating steps of the first polarized light irradiating step to the third polarized light irradiating step. This makes it possible to form an alignment film having a radial alignment pattern (not shown), which then makes it possible to manufacture an alignment film having a fine pattern such as a geometrically complex pattern like the above-mentioned radial alignment pattern.

As described above, an alignment film having a concentric alignment pattern (not shown) and an alignment film having a radial alignment pattern (not shown) can be formed. These alignment patterns have non-parallel patterns which are not parallel, and are different from patterns in which the alignment directions are parallel, such as stripe patterns. The non-parallel pattern is a pattern having a plurality of alignment directions, which are not parallel to each other. For example, in the above-mentioned radial alignment patterns, the patterns are spaced farther apart and are non-parallel instead of parallel.

The above-mentioned concentric alignment pattern is a pattern in which the alignment direction changes in a circular manner in at least one direction.

(Example of Configuration of Liquid Crystal Layer)

Next, an example of a configuration of a liquid crystal layer disposed on an alignment film obtained by the manufacturing method of an alignment film will be described.

Figure 21:
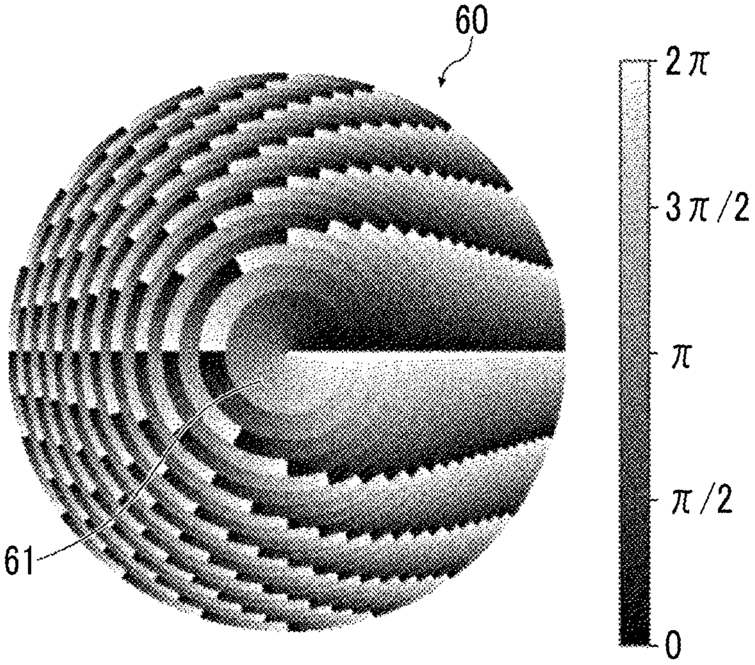
FIG. 21 is a schematic plan view showing an example of a configuration of a liquid crystal layer disposed on an alignment film formed using the manufacturing method of an alignment film according to the embodiment of the present invention.
Figure 22:
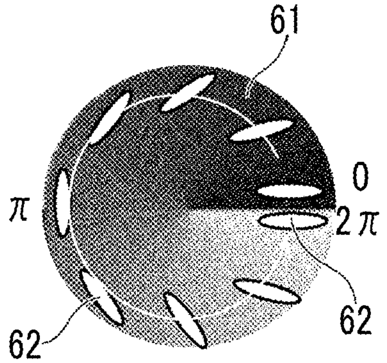
FIG. 22 is a partial enlarged view showing a central portion of an example of a configuration of a liquid crystal layer disposed on an alignment film formed using the manufacturing method of an alignment film according to the embodiment of the present invention.
Figure 23:
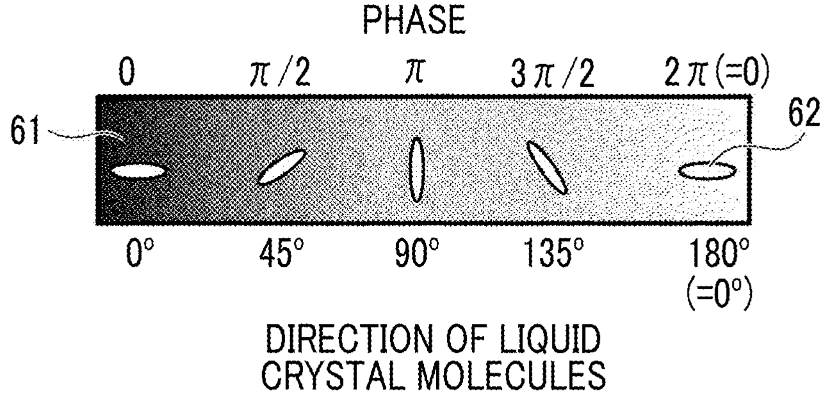
FIG. 23 is a schematic view for explaining a phase in a liquid crystal layer disposed on an alignment film formed using the manufacturing method of an alignment film according to the embodiment of the present invention.
Figure 24:
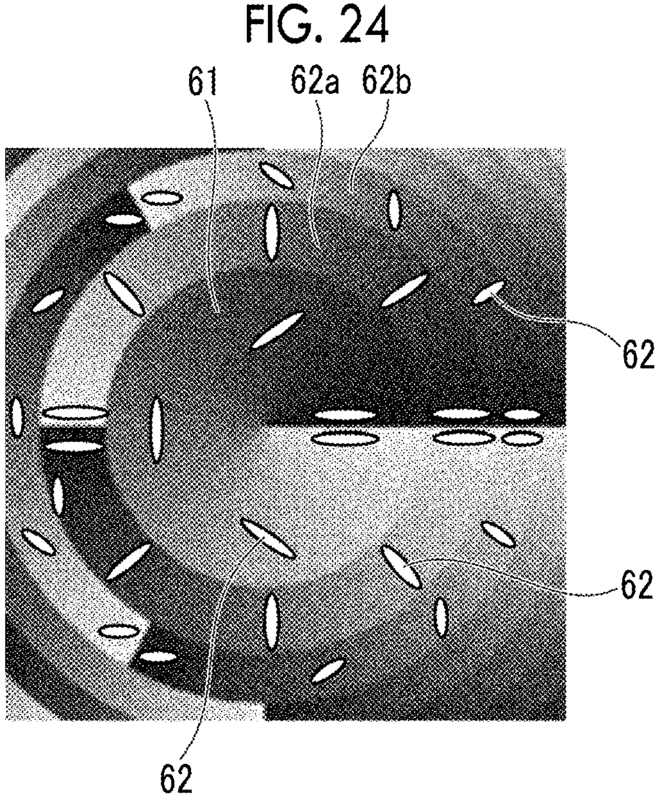
FIG. 24 is a partial enlarged view showing a main part including a central portion of an example of a configuration of a liquid crystal layer disposed on an alignment film formed using the manufacturing method of an alignment film according to the embodiment of the present invention.

FIG. 21 is a schematic plan view showing an example of the configuration of the liquid crystal layer disposed on the alignment film formed using the manufacturing method of an alignment film according to the embodiment of the present invention. FIG. 22 is a partial enlarged view showing a central portion of an example of the configuration of the liquid crystal layer disposed on the alignment film formed using the manufacturing method of an alignment film according to the embodiment of the present invention. FIG. 23 is a schematic view for explaining a phase in the liquid crystal layer disposed on the alignment film formed using the manufacturing method of an alignment film according to the embodiment of the present invention. FIG. 24 is a partial enlarged view showing a main part including a central portion of an example of the configuration of the liquid crystal layer disposed on the alignment film formed using the manufacturing method of an alignment film according to the embodiment of the present invention.

FIG. 21 is a plan view conceptually showing an example of a liquid crystal layer 60. FIG. 21 is a view in which the direction of an optical axis (slow axis) in each minute region of the liquid crystal layer 60 is expressed by a phase normalized from 0 to $2\pi$ and is visualized on a gray scale with 0 being black and $2\pi$ being white.

The liquid crystal layer 60 shown in FIG. 21 is formed of a composition containing a liquid crystal compound, and the optical axis derived from the liquid crystal compound is aligned into a vortex alignment pattern described below. In order to align the liquid crystal compound into a desired vortex alignment pattern, the liquid crystal layer 60 is formed on an alignment film (not shown) which is formed on a substrate (not shown).

As shown in FIG. 21, the liquid crystal layer 60 has a circular central portion and a plurality of annular portions having different inner diameters that are provided in a radial direction of the central portion with the centers of which coinciding with the center of the central portion. In the example shown in FIG. 21, the liquid crystal layer 60 has a central portion and 19 annular portions. A first annular portion radially from the central portion is in contact with the central portion, and a second annular portion is in contact with the first annular portion. That is, the annular portions are formed concentrically and in contact with each other in order with the same center as the center of the central portion.

As shown by the gray scale in FIG. 21, the phase (the direction of the optical axis) in the central portion and each of the annular portions changes in a circumferential direction.

For example, the phase in a central portion 61 of the liquid crystal layer 60 will be described with reference to FIG. 22. FIG. 22 is a view showing the phase in the central portion 61 of the liquid crystal layer 60 shown in FIG. 21. In FIG. 22, the phase in the liquid crystal layer 60 (the central portion 61) is shown by the gray scale, and the direction of an optical axis 62 is shown overlapping. Basically, the direction of the optical axis 62 in a minute region in the liquid crystal layer is a direction of an optical axis derived from the liquid crystal compound. Accordingly, the optical axis 62 in FIG. 22 can also be referred to as the optical axis of the liquid crystal compound. In a case where the liquid crystal compound is a rod-like liquid crystal compound, a major axis of the rod-like liquid crystal compound is the optical axis derived from the liquid crystal compound. In addition, in a case where the liquid crystal compound is a disk-like liquid crystal compound, the axis perpendicular to a disc plane of the disk-like liquid crystal compound is the optical axis.

As shown in FIG. 22, in a case of being viewed counterclockwise in the circumferential direction of the central portion 61, the direction of the optical axis 62 (liquid crystal compound) in the minute region rotates counterclockwise. In the example shown in the drawing, the optical axis 62 rotates half a turn, that is, the phase gradually changes from 0 to 2π while the central portion 61 is one turn in the circumferential direction of the central portion 61 from a position where the phase is 0.

The phase will be described with reference to FIG. 23.

FIG. 23 is a view showing a relationship between a direction of an optical axis and a normalized phase in each of minute regions. FIG. 23 also shows the direction of the liquid crystal molecules.

A state in which an optical axis 62 is directed in a left-right direction in the drawing (an angle $\theta_\gamma$ of the optical axis in polar coordinate display, which will be described later, is 0°) as in the leftmost optical axis 62 in FIG. 23 is defined as a phase of 0, a state in which the optical axis 62 is rotated counterclockwise by 1800 as in the rightmost optical axis 62 in the drawing is defined as a phase of 2π, and the phase is normalized according to the angle by which the optical axis 62 is rotated counterclockwise. For example, a state in which the optical axis 62 is rotated counterclockwise by 450 (the second optical axis 62 from the left) is a phase of π/2, a state in which the optical axis 62 is rotated counterclockwise by 900 (the third optical axis 62 from the left) is a phase of π, and a state in which the optical axis 62 is rotated counterclockwise by 1350 (the second optical axis 62 from the right) is a phase of 3π/2. The change in the optical axis 62 is actually a continuous change, and the optical axes 62 that are aligned at angles between the angles of the optical axes 62 in FIG. 23 are present between the optical axes 62. In addition, as can be seen from FIG. 23, the state of the optical axis in a phase of 0 and the state of the optical axis in a phase of 27 are the same.

Next, the phase of the annular portion will be described with reference to FIG. 24.

FIG. 24 is an enlarged view of a portion of the liquid crystal layer 60 shown in FIG. 21, and is a view showing the phases of the central portion 61 and each of the annular portions.

As shown in FIG. 24, in a first annular portion 62*a* in a radial direction from the central portion 61 (hereinafter, referred to as a first annular portion 62*a*), the direction of the optical axis 62 in a minute region rotates counterclockwise once in a case of being viewed counterclockwise in the circumferential direction of the first annular portion 62*a*. That is, in the example shown in the drawing, the first annular portion 62*a* repeats a phase change from 0 to 2π twice while making one revolution in the circumferential direction of the first annular portion 62*a* from a position where the phase is 0. That is, the number of times of phase changes in the first annular portion 62*a* is one more than that in the central portion 61.

Next, in a second annular portion 62*b* in a radial direction from the central portion 61 (hereinafter, referred to as a second annular portion 62*b*), the direction of the optical axis 62 in a minute region rotates counterclockwise 1.5 times in a case of being viewed counterclockwise in the circumferential direction of the second annular portion 62*b*. That is, in the example shown in the drawing, the second annular portion 62*b* repeats a phase change from 0 to 2π three times while making one revolution in the circumferential direction of the second annular portion 62*b* from a position where the phase is 0. That is, the number of times of phase changes in the second annular portion 62*b* is one more than that in the first annular portion 62*a*.

In the liquid crystal layer 60, the same applies to the third and subsequent annular portions in a radial direction from the central portion 61. In a case of being viewed counterclockwise in the circumferential direction of the annular portion, the annular portion repeats a phase change from 0 to 2π a plurality of times while making one revolution in the circumferential direction of the annular portion from a position where the phase is 0, and the number of repetitions of phase changes is one more than that of the adjacent annular portion on the inside.

That is, in the liquid crystal layer 60 shown in FIG. 21, the n-th annular portion repeats a phase change n+1 times.

In this manner, a pattern having a central portion and a plurality of annular portions, in which the phase change occurs once or more in the circumferential direction in each of the central portion and the plurality of annular portions, and the n-th annular portion repeats the phase change n+m times (m is the number of times of phase changes in the central portion) is referred to as a "vortex alignment pattern". The vortex alignment pattern is a pattern in which the alignment direction changes like a vortex, and is an alignment pattern formed on the photo-alignment film material layer 18 (refer to FIG. 3).

In such a vortex alignment pattern, in polar coordinates of r and φ with the center of the central portion 61 of the liquid crystal layer 60 as the origin, the angle $\theta_\gamma$ [° ] of the optical axis 62 in a region where φ is $\varphi_\gamma$ is expressed by Expression (4).

$$\theta_\gamma = \alpha_\gamma \times \varphi_\gamma + \theta_{0n\gamma}. \quad (4)$$

Here, $\theta_{0n\gamma}$ [° ] is the direction of the optical axis 62 at $\varphi_\gamma$=0° for the central portion 61 and each annular portion. In the examples shown in FIG. 21 and FIG. 24, $\theta_{0n\gamma}$=0° for all the central portions 61 and annular portions.

The change in the angle $\theta_\gamma$ of the optical axis 62 in the central portion 61 is expressed by $\alpha_\gamma$=m×0.5 in Expression (4) in a case where m is an integer of 1 or more. In addition, in Expression (4), the change in the angle $\theta_\gamma$ of the optical axis in the n-th annular portion from the central portion 61 is expressed by $\alpha_\gamma$=(m+n)×0.5.

m has the same meaning as the number of times of phase changes in the central portion 61 described above, and in the examples shown in FIG. 22 and FIG. 24, m=1. Therefore, in Expression (4) at the central portion 61, $\alpha_\gamma$=1×0.5=0.5, and therefore $\theta_\gamma$=0.5×$\varphi_\gamma$+0°. From this expression, the angle $\theta_\gamma$ of the optical axis 62 at the central portion 61 is found to be $\theta_\gamma$=0° in a region of $\varphi_\gamma$=0°, $\theta_\gamma$=45° in a region of $\varphi_\gamma$=90°, $\theta_\gamma$=90° in a region of $\varphi_\gamma$=180°, $\theta_\gamma$=135° in a region of $\varphi_\gamma$=270°, and $\theta_\gamma$=180° in a region of $\varphi_\gamma$=360°. It can be seen that this coincides with the example shown in FIG. 22.

In addition, in Expression (4) at the first annular portion 62*a* of the example shown in FIG. 24, $\alpha_\gamma$=(1+1)×0.5=1, and therefore $\theta_\gamma$=1×$\varphi_\gamma$+0°. From this expression, the angle $\theta_\gamma$ of the optical axis 62 at the first annular portion 62*a* is found to be $\theta_\gamma$=0° in a region of $\varphi_\gamma$=0°, $\theta_\gamma$=90° in a region of $\varphi_\gamma$=90°, $\theta_\gamma$=180° in a region of $\varphi_\gamma$=180°, $\theta_\gamma$=270° in a region of $\varphi_\gamma$=270°, and $\theta_\gamma$=360° in a region of $\varphi_\gamma$=360°. It can be seen that this coincides with the first annular portion 62*a* of the example shown in FIG. 24.

Similarly, in Expression (4) at the second annular portion 62*b* of the example shown in FIG. 24, $\alpha_\gamma$=(1+2)×0.5=1.5, and therefore $\theta_\gamma$=1.5×$\varphi_\gamma$+0°. From this expression, the angle $\theta_\gamma$ of the optical axis 62 at the second annular portion 62*b* is $\theta_\gamma$=0° in a region of $\varphi_\gamma$=0°, $\theta_\gamma$=135° in a region of $\varphi_\gamma$=90°, $\theta_\gamma$=270° in a region of $\varphi_\gamma$=180°, $\theta_\gamma$=405°=45° in a region of $\varphi_\gamma$=270°, and $\theta_\gamma$=540°=180° in a region of $\varphi_\gamma$=360°. It can be seen that this coincides with the second annular portion 62*b* of the example shown in FIG. 24.

In the n-th annular portion, the angle $\theta_\gamma$ of the optical axis 62 can also be obtained from Expression (4).

The liquid crystal layer 60 in a lens device of the present invention satisfies the angle θ7 of the optical axis obtained by Expression (4) in a range of ±3°.

That is, in polar coordinates of r and φ with the center of the central portion of the liquid crystal layer as the origin, in a region where φ is $\varphi_\gamma$, in a case where a pattern in which the angle $\theta_\gamma$ [° ] of the optical axis of the liquid crystal layer satisfies a relationship expressed by Expression (5) is defined as a vortex alignment pattern, the central portion of the liquid crystal layer has a vortex alignment pattern in which $\alpha_\gamma$=m×0.5 in a case where m is an integer of 1 or more, and an n-th annular portion from the central portion of the liquid crystal layer has a vortex alignment pattern in which $\alpha_\gamma$=(m+n)×0.5.

$$\{\alpha_\gamma \times \varphi_\gamma + \theta_{0n\gamma}\} - 3° < \theta_\gamma < \{\alpha_\gamma \times \varphi_\gamma + \theta_{0n\gamma}\} + 3°. \quad (5)$$

(Here, $\theta_{0n\gamma}$[°] is the direction of the optical axis at $\varphi_\gamma$=0° for the central portion and each annular portion)

Next, the manufacturing method of an alignment film for obtaining the liquid crystal layer 60 shown in FIG. 21 will be described.

Figure 25:
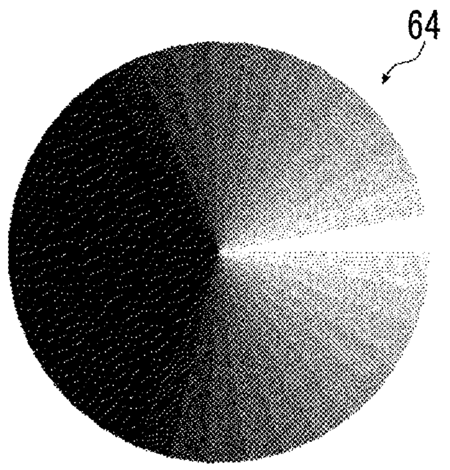
FIG. 25 is a schematic view showing an example of the first mask used in the manufacturing method of an alignment film according to the embodiment of the present invention.
Figure 26:
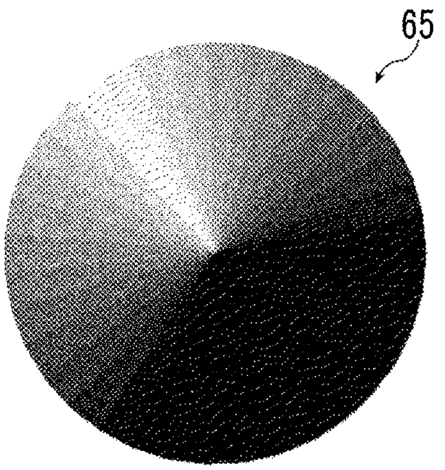
FIG. 26 is a schematic view showing an example of the second mask used in the manufacturing method of an alignment film according to the embodiment of the present invention.
Figure 27:
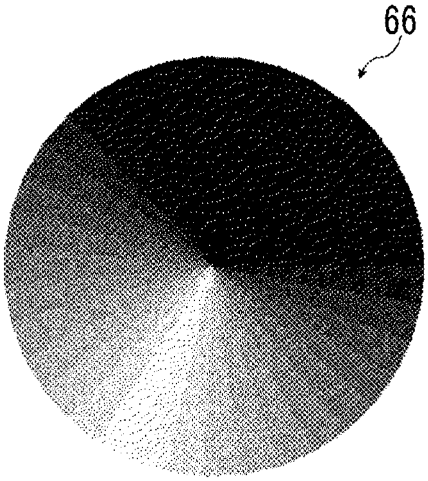
FIG. 27 is a schematic view showing an example of the third mask used in the manufacturing method of an alignment film according to the embodiment of the present invention.
Figure 28:
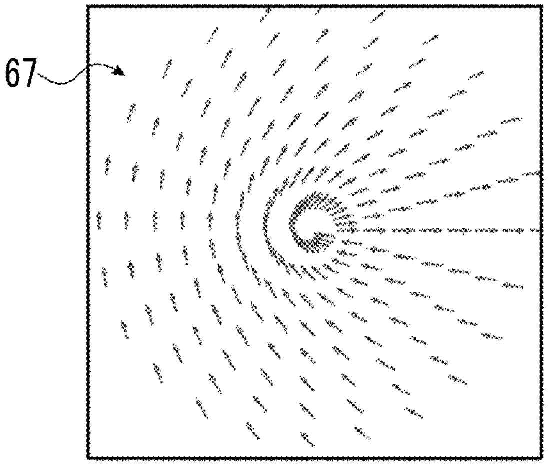
FIG. 28 is a schematic view showing an irradiation light pattern formed using the manufacturing method of an alignment film according to the embodiment of the present invention.

FIG. 25 is a schematic view showing an example of a first mask used in the manufacturing method of an alignment film according to the embodiment of the present invention. FIG. 26 is a schematic view showing an example of a second mask used in the manufacturing method of an alignment film according to the embodiment of the present invention. FIG. 27 is a schematic view showing an example of a third mask used in the manufacturing method of an alignment film according to the embodiment of the present invention. FIG. 28 is a schematic view showing an irradiation light pattern formed using the manufacturing method of an alignment film according to the embodiment of the present invention.

In the manufacturing method of an alignment film (not shown) for obtaining the liquid crystal layer 60 shown in FIG. 21, the first polarization direction θ1, the second polarization direction θ2, and the third polarization direction θ3 are the directions shown in FIG. 15 described above. In addition, the directions A1 to A3 of the linearly polarized light are also the directions shown in FIG. 15 described above.

In the manufacturing method of an alignment film for obtaining the liquid crystal layer 60 shown in FIG. 21, an alignment film is manufactured in the same manner as the second example of the manufacturing method of an alignment film described above, except that a first mask 64 shown in FIG. 25 is used in the first polarized light irradiating step, a second mask 65 shown in FIG. 26 is used in the second polarized light irradiating step, and a third mask 66 shown in FIG. 27 is used in the third polarized light irradiating step.

An irradiation light pattern 67 shown in FIG. 28 is formed on the photo-alignment film material layer 18 by the first polarized light irradiating step using the first mask 64 shown in FIG. 25, the second polarized light irradiating step using the second mask 65 shown in FIG. 26, and the third polarized light irradiating step using the third mask 66 shown in FIG. 27. An alignment pattern is formed on the photo-alignment film material layer 18 (refer to FIG. 3) by the irradiation light pattern 67, thereby forming an alignment film (not shown). The liquid crystal layer 60 shown in FIG. 21 is obtained by disposing a liquid crystal containing liquid crystal molecules (not shown) on the alignment film.

The irradiation light pattern 67 shown in FIG. 28 is a vortex alignment pattern, and includes a pattern in which the alignment angle changes in proportion to the polar angle in polar coordinate display from the center. In addition, in a case where the irradiation light pattern 67 shown in FIG. 28 is used as the alignment pattern, the irradiation light pattern 67 has a pattern in which the alignment direction changes in a circular manner in at least one direction.

The alignment film (not shown) for obtaining the liquid crystal layer 60 shown in FIG. 21 can be manufactured using the above-mentioned manufacturing device 10 shown in FIG. 3.

Next, other patterns of the liquid crystal layer will be described.

Figure 29:
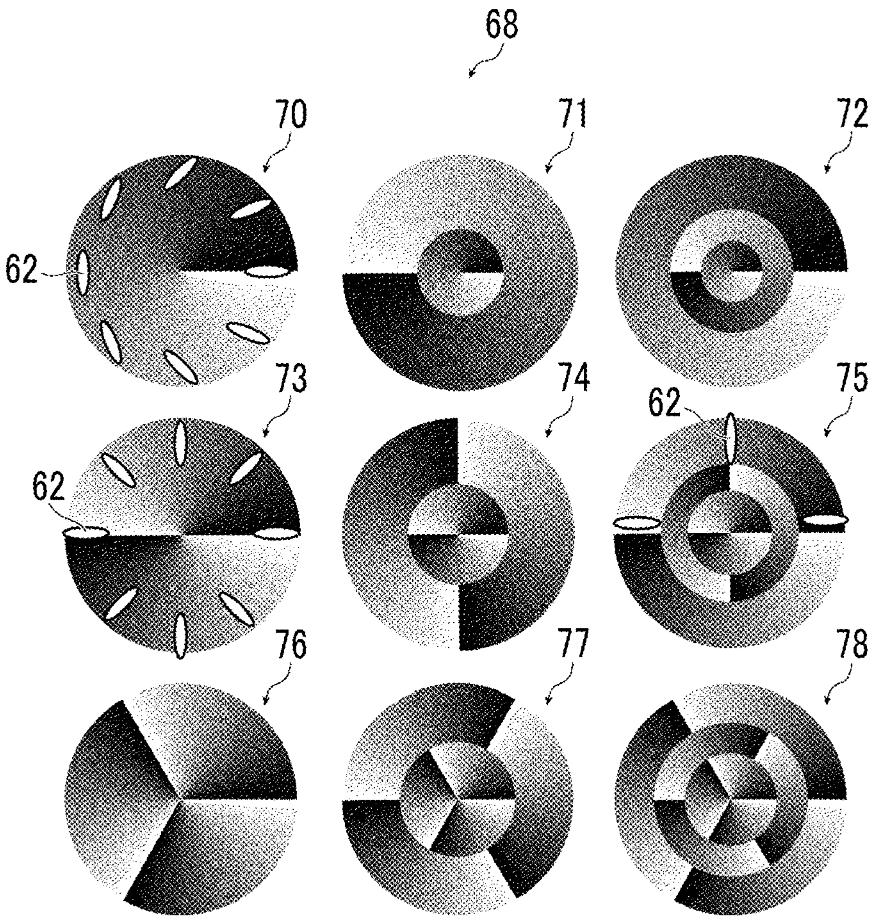
FIG. 29 is a schematic plan view showing an example of a liquid crystal layer group disposed on an alignment film group formed using the manufacturing method of an alignment film according to the embodiment of the present invention.

FIG. 29 is a schematic plan view showing an example of a liquid crystal layer group disposed on an alignment film group formed using the manufacturing method of an alignment film according to the embodiment of the present invention. FIG. 29 shows the optical axis 62 in a part in the same manner as the liquid crystal layer 60 shown in FIG. 21.

Figure 30:
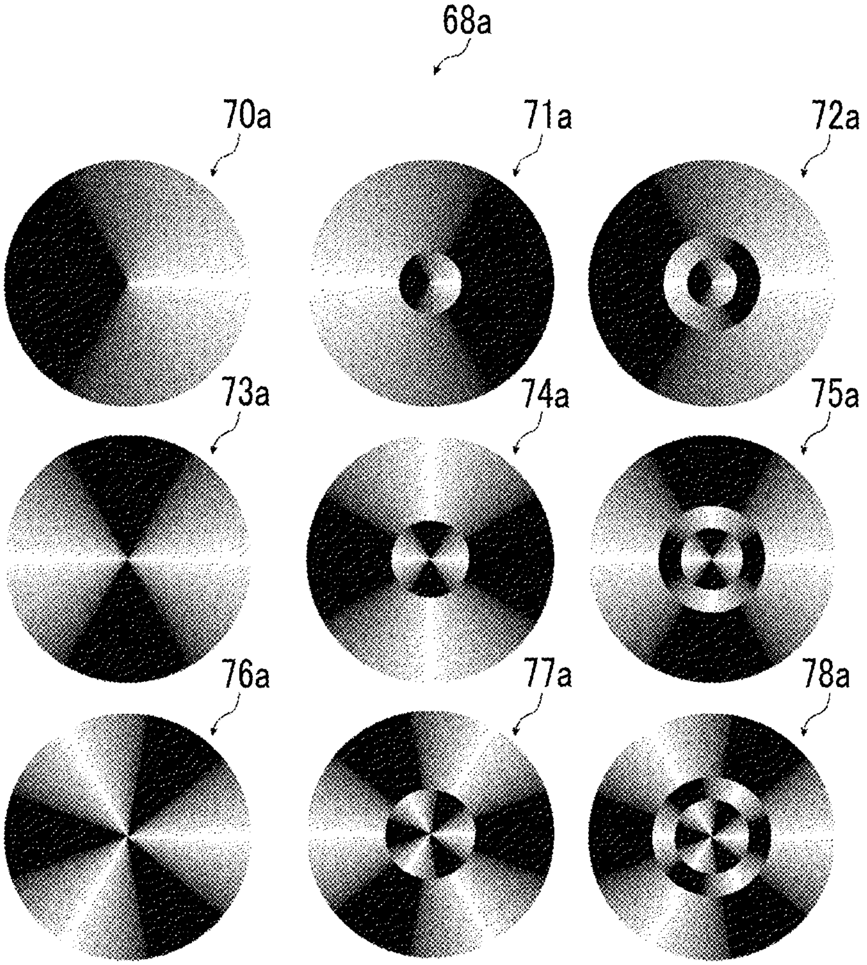
FIG. 30 is a schematic view showing an example of a first mask group used for forming an alignment film group formed by the manufacturing method of an alignment film according to the embodiment of the present invention.
Figure 31:
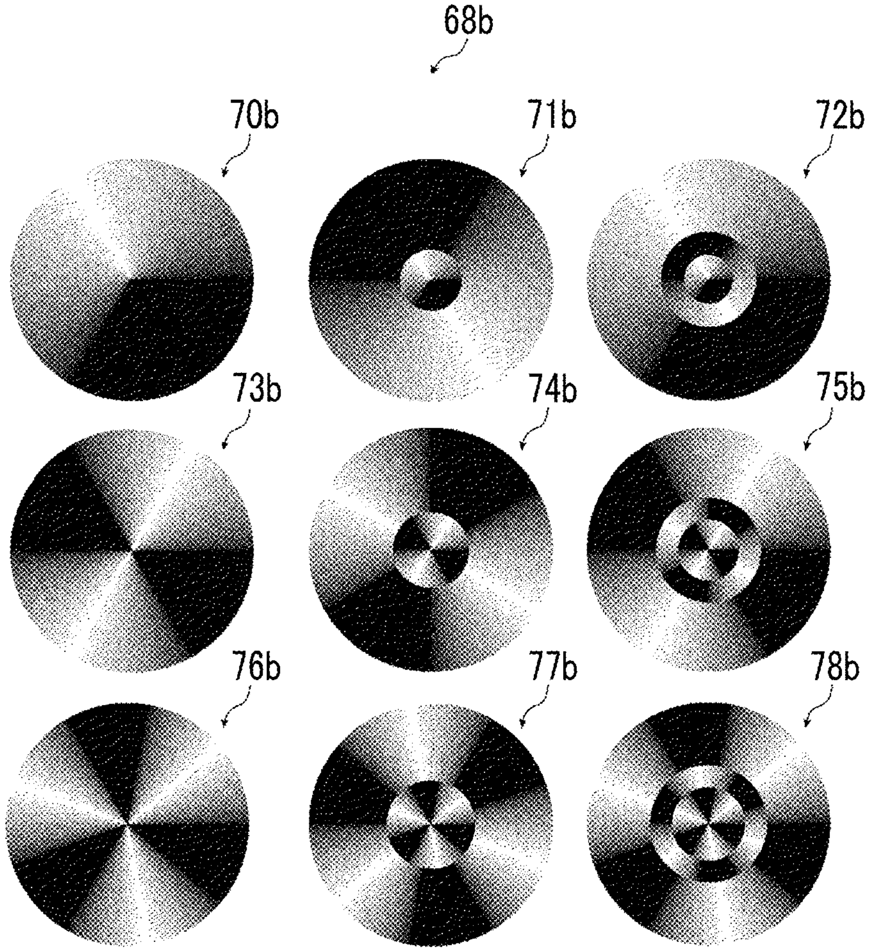
FIG. 31 is a schematic view showing an example of a second mask group used for forming an alignment film group formed by the manufacturing method of an alignment film according to the embodiment of the present invention.
Figure 32:
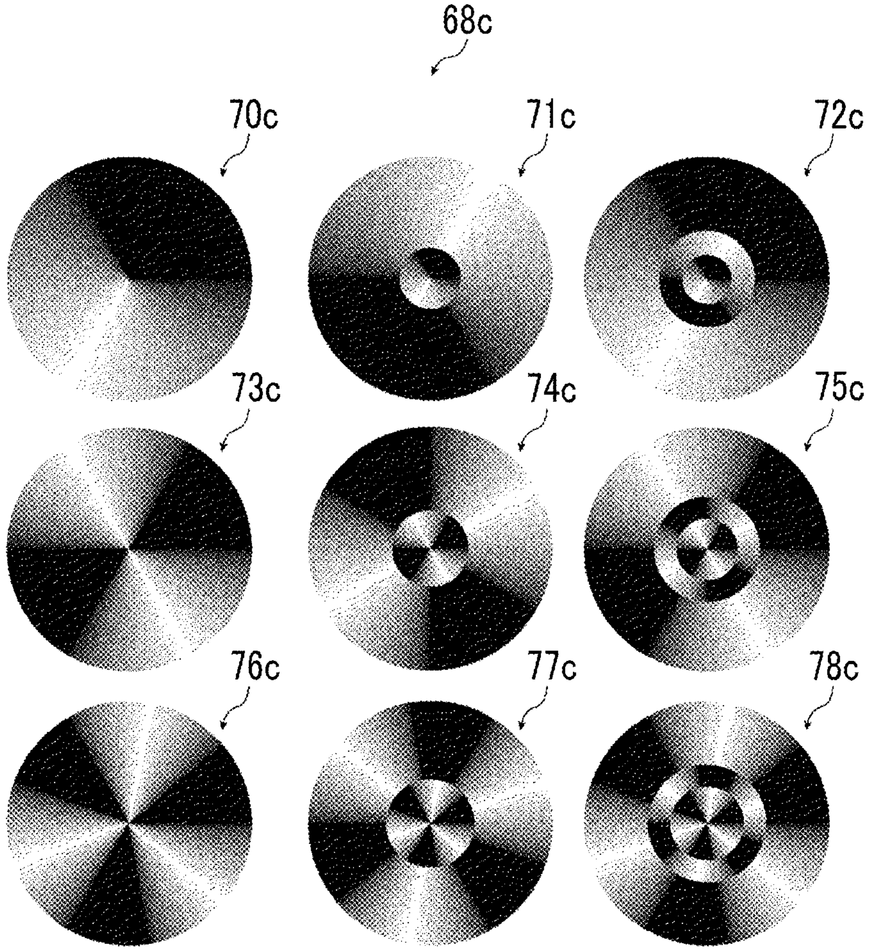
FIG. 32 is a schematic view showing an example of a third mask group used for forming an alignment film group formed by the manufacturing method of an alignment film according to the embodiment of the present invention.

FIG. 30 is a schematic view showing an example of a first mask group used for forming the alignment film group formed by the manufacturing method of an alignment film according to the embodiment of the present invention. FIG. 31 is a schematic view showing an example of a second mask group used for forming the alignment film group formed by the manufacturing method of an alignment film according to the embodiment of the present invention. FIG. 32 is a schematic view showing an example of a third mask group used for forming the alignment film group formed by the manufacturing method of an alignment film according to the embodiment of the present invention.

A liquid crystal layer group 68 shown in FIG. 29 has, for example, nine liquid crystal layers 70 to 78. All of the nine liquid crystal layers 70 to 78 are expressed by a phase in which the direction of the optical axis (slow axis) is normalized from 0 to 2π and are visualized on a gray scale with 0 being black and 2π being white. This gray scale also schematically shows the direction of the liquid crystal molecules (not shown) as shown in FIG. 23 above.

The alignment films of the nine liquid crystal layers 70 to 78 shown in the liquid crystal layer group 68 can also be manufactured in the same manner as the first example of the manufacturing method of an alignment film and the second example of the manufacturing method of an alignment film described above.

In the manufacturing method of the alignment films of the liquid crystal layers 70 to 78, the first polarization direction θ1, the second polarization direction θ2, and the third polarization direction θ3 are the directions shown in FIG. 9. In addition, the directions A1 to A3 of the linearly polarized light are also the directions shown in FIG. 9.

In the manufacturing method of the alignment films of the liquid crystal layers 70 to 78, a first mask group 68*a* shown in FIG. 30 is used in the first polarized light irradiating step, a second mask group 68*b* shown in FIG. 31 is used in the second polarized light irradiating step, and a third mask group 68*c* shown in FIG. 32 is used in the third polarized light irradiating step.

The alignment film of the liquid crystal layer 70 of the liquid crystal layer group 68 shown in FIG. 29 is manufactured using a first mask 70*a* of the first mask group 68*a* shown in FIG. 30, a second mask 70*b* of the second mask group 68*b* shown in FIG. 31, and a third mask 70*c* of the third mask group 68*c* shown in FIG. 32.

The alignment film of the liquid crystal layer 71 of the liquid crystal layer group 68 shown in FIG. 29 is manufactured using a first mask 71*a* of the first mask group 68*a* shown in FIG. 30, a second mask 71*b* of the second mask group 68*b* shown in FIG. 31, and a third mask 71*c* of the third mask group 68*c* shown in FIG. 32.

The alignment film of the liquid crystal layer 72 of the liquid crystal layer group 68 shown in FIG. 29 is manufactured using a first mask 72*a* of the first mask group 68*a* shown in FIG. 30, a second mask 72*b* of the second mask group 68*b* shown in FIG. 31, and a third mask 72*c* of the third mask group 68*c* shown in FIG. 32.

The alignment film of the liquid crystal layer 73 of the liquid crystal layer group 68 shown in FIG. 29 is manufactured using a first mask 73*a* of the first mask group 68*a* shown in FIG. 30, a second mask 73*b* of the second mask group 68*b* shown in FIG. 31, and a third mask 73*c* of the third mask group 68*c* shown in FIG. 32.

The alignment film of the liquid crystal layer 74 of the liquid crystal layer group 68 shown in FIG. 29 is manufactured using a first mask 74*a* of the first mask group 68*a* shown in FIG. 30, a second mask 74*b* of the second mask group 68*b* shown in FIG. 31, and a third mask 74*c* of the third mask group 68*c* shown in FIG. 32.

The alignment film of the liquid crystal layer 75 of the liquid crystal layer group 68 shown in FIG. 29 is manufactured using a first mask 75*a* of the first mask group 68*a* shown in FIG. 30, a second mask 75*b* of the second mask group 68*b* shown in FIG. 31, and a third mask 75*c* of the third mask group 68*c* shown in FIG. 32.

The alignment film of the liquid crystal layer 76 of the liquid crystal layer group 68 shown in FIG. 29 is manufactured using a first mask 76*a* of the first mask group 68*a* shown in FIG. 30, a second mask 76*b* of the second mask group 68*b* shown in FIG. 31, and a third mask 76*c* of the third mask group 68*c* shown in FIG. 32.

The alignment film of the liquid crystal layer 77 of the liquid crystal layer group 68 shown in FIG. 29 is manufactured using a first mask 77*a* of the first mask group 68*a* shown in FIG. 30, a second mask 77*b* of the second mask group 68*b* shown in FIG. 31, and a third mask 77*c* of the third mask group 68*c* shown in FIG. 32.

The alignment film of the liquid crystal layer 78 of the liquid crystal layer group 68 shown in FIG. 29 is manufactured using a first mask 78*a* of the first mask group 68*a* shown in FIG. 30, a second mask 78*b* of the second mask group 68*b* shown in FIG. 31, and a third mask 78*c* of the third mask group 68*c* shown in FIG. 32.

In the manufacturing method of the alignment films of the nine liquid crystal layers 70 to 78 of the liquid crystal layer group 68 shown in FIG. 29, for example, the alignment films of the nine liquid crystal layers 70 to 78 of the liquid crystal layer group 68 can be formed on one photo-alignment film material layer 18 (refer to FIG. 3) by carrying out the polarized light irradiating steps three times using the first mask group 68*a* shown in FIG. 30 in the first polarized light irradiating step, using the second mask group 68*b* shown in FIG. 31 in the second polarized light irradiating step, and using the third mask group 68*c* shown in FIG. 32 in the third polarized light irradiating step. In this manner, a plurality of different alignment patterns can be formed on one photo-alignment film material layer 18 by carrying out the polarized light irradiating steps three times.

In addition, by selecting the first mask from the first mask group 68*a*, and the second mask from the second mask group 68*b*, and the third mask from the third mask group 68*c*, it is possible to select a plurality of alignment films among the alignment films of the nine liquid crystal layers 70 to 78 of the liquid crystal layer group 68 shown in FIG. 29, and form the alignment patterns of the plurality of alignment films on one photo-alignment film material layer 18.

Figure 33:
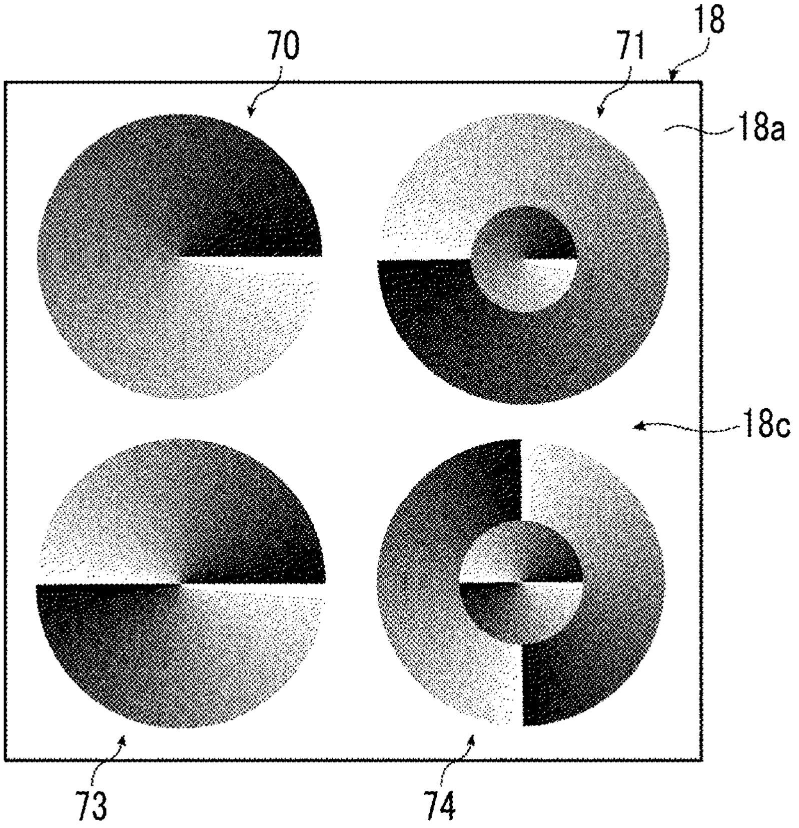
FIG. 33 is a schematic view showing an example of the third mask group used for forming an alignment film group formed by the manufacturing method of an alignment film.

For example, the alignment patterns of the alignment films of the four liquid crystal layers 70, 71, 73, and 74 shown in FIG. 33 can be formed on one photo-alignment film material layer 18 by carrying out the polarized light irradiating steps three times. A region 18*c* on the surface 18*a* of the photo-alignment film material layer 18 other than the alignment pattern may or may not be aligned. In a case where the region 18*c* on the surface 18*a* of the photo-alignment film material layer 18 is aligned, the alignment direction is not particularly limited.

In addition, the alignment films of the nine liquid crystal layers 70 to 78 of the liquid crystal layer group 68 shown in FIG. 29 can also be formed individually on one photo-alignment film material layer 18.

In the first polarized light irradiating step, the second polarized light irradiating step, and the third polarized light irradiating step, the adjustment of the intensity of light is not limited to using a mask, and the intensity of light can also be adjusted by adjusting the emission intensity of the light source 24 (refer to FIG. 3) without using a mask.

Next, a substrate and a photo-alignment film material layer used in the manufacturing method of an alignment film will be described.

[Substrate]

The substrate that supports the photo-alignment film material layer is not particularly limited as long as the substrate can support the photo-alignment film material layer, and a sheet-like substrate that is not long is preferable.

A transmittance of the substrate with respect to light to be diffracted is preferably 50% or more, more preferably 70% or more, and still more preferably 85% or more.

The transmittance with respect to light to be diffracted is measured using "Plastics—Determination of Total Light Transmittance and Total Light Reflectance" specified in Japanese Industrial Standards (JIS) K 7375: 2008.

The thickness of the substrate is not limited, and a thickness capable of supporting the alignment film and the liquid crystal layer may be appropriately set depending on the use application, the material for forming the substrate, and the like.

The thickness of the substrate is preferably 1 to 1000 m, more preferably 3 to 250 m, and still more preferably 5 to 150 m.

The substrate may be of a single layer or a multilayer.

The substrate in a case where the substrate is of a single layer may be, for example, a substrate consisting of glass, triacetyl cellulose (TAC), polyethylene terephthalate (PET), polycarbonate, polyvinyl chloride, acrylic, polyolefin, or the like. The substrate may be a glass substrate or the like.

The substrate in a case where the substrate is of a multilayer may be, for example, one including any of the above-mentioned single-layered substrates as a substrate and another layer provided on the surface of the substrate.

[Photo-Alignment Film Material Layer]

Preferred examples of compounds having a photo-aligned group used in the photo-alignment film material layer, that is, photo-alignment film materials used in the photo-alignment film material layer include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; aromatic ester compounds described in JP2002-229039A; maleimide- and/or alkenyl-substituted nadiimide compounds having a photo-alignable unit described in JP2002-265541A and JP2002-317013A; photocrosslinking silane derivatives described in JP4205195B and JP4205198B; photocrosslinking polyimides, photocrosslinking polyamides, and photocrosslinking polyesters described in JP2003-520878A, JP2004-529220A, and JP4162850B; and photodimerizable compounds, in particular, cinnamate compounds, chalcone compounds, and coumarin compounds described in JP1997-118717A (JP-H09-118717A), JP1998-506420A (JP-H10-506420A), JP2003-505561A, WO2010/150748A, JP2013-177561A, and JP2014-12823A.

Above all, preferred are materials that exhibit an alignment restriction force through a crosslinking reaction, a dimerization reaction, or an isomerization reaction upon irradiation with light, such as azo compounds, photocrosslinking polyimides, photocrosslinking polyamides, photocrosslinking polyesters, cinnamate compounds, and chalcone compounds. This is because, with these materials, even in a case where the polarized light irradiation is carried out three times, the proportional relationship between the exposure amount and the alignment restriction force expressed by Expression (1) does not substantially change for each irradiation, and thus a desired alignment pattern can be easily obtained.

The thickness of the photo-alignment film material layer is not limited, and a thickness with which a required alignment function can be obtained may be appropriately set depending on the material for forming the photo-alignment film material layer.

The thickness of the photo-alignment film material layer is preferably 0.01 to 5 m, and more preferably 0.05 to 2 m.

[Liquid Crystal Layer]

The liquid crystal layer can be formed by applying a liquid crystal composition containing a liquid crystal compound onto an alignment film to form a liquid crystal phase in which the direction of an optical axis derived from the liquid crystal compound is aligned in an alignment pattern, and immobilizing the liquid crystal phase in a layer shape.

In addition, the liquid crystal layer may also be formed by multi-layer application. The multi-layer application refers to a method of forming a liquid crystal layer by repeating the following processes until a desired thickness is obtained, the processes including: forming a first liquid crystal immobilized layer by applying a liquid crystal composition for forming the first layer on the alignment film, heating the liquid crystal composition, cooling the liquid crystal composition, and irradiating the liquid crystal composition with ultraviolet rays for curing; and forming a second or subsequent liquid crystal immobilized layer by applying a liquid crystal composition for forming the second or subsequent layer on the formed liquid crystal immobilized layer, heating the liquid crystal composition, cooling the liquid crystal composition, and irradiating the liquid crystal composition with ultraviolet rays for curing as described above.

The structure in which a liquid crystal phase is immobilized may be any structure in which the alignment of the liquid crystal compound in the liquid crystal phase is maintained. Typically, the structure in which a liquid crystal phase is immobilized is preferably a structure in which a polymerizable liquid crystal compound is brought into an alignment state according to an alignment pattern and is polymerized and cured by ultraviolet irradiation, heating, or the like to form a layer having no fluidity, and simultaneously, the layer has been changed into a state in which the alignment form is not changed by an external field or an external force.

In the structure in which the liquid crystal phase is immobilized, it is sufficient that the optical properties of the liquid crystal phase are maintained, and the liquid crystal compound in the liquid crystal layer does not necessarily exhibit liquid crystallinity. For example, the polymerizable liquid crystal compound may be made to have a high molecular weight by a curing reaction and therefore the liquid crystallinity may be lost.

Examples of the material used for forming the liquid crystal layer obtained by immobilizing a liquid crystal phase include a liquid crystal composition containing a liquid crystal compound. It is preferable that the liquid crystal compound is a polymerizable liquid crystal compound.

In addition, the liquid crystal composition used for forming the liquid crystal layer may further contain a surfactant, a polymerization initiator, and the like.

The liquid crystal compound of the liquid crystal layer is not particularly limited, and a rod-like liquid crystal compound and a disk-like liquid crystal compound can be used. In a case of the disk-like liquid crystal compound, the optical axis derived from the liquid crystal compound is defined as an axis perpendicular to a disc plane, that is, a so-called fast axis.

The present invention is basically configured as described above. Although the manufacturing method of an alignment film and the manufacturing device of an alignment film according to the embodiment of the present invention have been described in detail above, the present invention is not limited to the above-mentioned embodiments, and various improvements or modifications can be made without departing from the spirit and scope of the present invention.

EXPLANATION OF REFERENCES

10: manufacturing device
12: stage
12*a*: surface
14: irradiation unit
16: substrate
18: photo-alignment film material layer
18*a*: surface
19: laminate
20: polarizing plate
22: mask
24: light source
26: adjustment unit
27: shutter
28: controller
29: light source unit
30, 64: first mask
31, 33, 35: light transmitting portion
31*a*: region
31*b*: region
31*c*, 33*c*, 35*c*: light shielding portion
32, 65: second mask
33*a*: region
33*b*: region
34, 66: third mask
35*a*: region
35*b*: region
36: irradiation light pattern
37: first overlapping region
38: second overlapping region
39: third overlapping region
40: first connection region
41: second connection region
42: third connection region
50, 55: first irradiation light amount pattern
50*a*, 51*a*, 52*a*: region
51, 56: second irradiation light amount pattern
52, 57: third irradiation light amount pattern
53, 58: exposure pattern
54, 59, 67: irradiation light pattern
55*a*, 56*a*, 57*a*: region
60: liquid crystal layer
61: central portion
62: optical axis
62*a*: first annular portion
62*b*: second annular portion
68: liquid crystal layer group
68*a*: first mask group
68*b*: second mask group
68*c*: third mask group
70, 71, 72, 73, 74, 75, 76, 77, 78: liquid crystal layer
70*a*, 71*a*, 72*a*, 73*a*, 74*a*, 75*a*, 76*a*, 77*a*, 78*a*: first mask
70*b*, 71*b*, 72*b*, 73*b*, 74*b*, 75*b*, 76*b*, 77*b*, 78*b*: second mask
70*c*, 71*c*, 72*c*, 73*c*, 74*c*, 75*c*, 76*c*, 77*c*, 78*c*: third mask
A1, A2, A3: direction
AD1, AD2, AD3, AD5: alignment direction
Lv: irradiation light
θ2: second polarization direction
θ3: third polarization direction
$\theta_D$: angle
$\theta_E$: angle

What is claimed is:

1. A manufacturing device of an alignment film, comprising:

a stage on which a laminate in which a photo-alignment film material layer is provided on a substrate is placed; and an irradiation unit that carries out first polarized light irradiation, second polarized light irradiation, and third polarized light irradiation on the photo-alignment film material layer of the laminate, wherein the irradiation unit includes a light source unit that emits linearly polarized light in a first polarization direction, linearly polarized light in a second polarization direction, and linearly polarized light in a third polarization direction to the photo-alignment film material layer of the laminate, and an adjustment unit that adjusts the light source unit such that an intensity of the linearly polarized light in the first polarization direction forms a first irradiation light amount pattern on the photo-alignment film material layer provided on the substrate, adjusts the light source unit such that an intensity of the linearly polarized light in the second polarization direction forms a second irradiation light amount pattern on the photo-alignment film material layer provided on the substrate, and adjusts the light source unit such that an intensity of the linearly polarized light in the third polarization direction forms a third irradiation light amount pattern on the photo-alignment film material layer provided on the substrate, and the adjustment unit further adjusts an irradiation light pattern formed by superimposing the first irradiation light amount pattern, the second irradiation light amount pattern, and the third irradiation light amount pattern on the photo-alignment film material layer such that the irradiation light pattern has at least a first overlapping region where the first irradiation light amount pattern and the second irradiation light amount pattern overlap, a second overlapping region where the first irradiation light amount pattern and the third irradiation light amount pattern overlap, and a third overlapping region where the second irradiation light amount pattern and the third irradiation light amount pattern overlap, in a case where the second polarization direction is defined as θ2, the first polarization direction is defined as 0°, and counterclockwise with respect to the first polarization direction is defined as positive, the second polarization direction θ2 satisfies $10° < \theta 2 < 90°$, and in a case where the third polarization direction is defined as θ3, the second polarization direction is defined as 0°, and the counterclockwise with respect to the first polarization direction is defined as positive, the third polarization direction θ3 satisfies $10° < \theta 3 < 90°$ and $\theta 3 + \theta 2 > 90°$, and the first polarized light irradiation, the second polarized light irradiation, and the third polarized light irradiation by the irradiation unit are carried out in a state where a position of the laminate placed on the stage is fixed.

2. The manufacturing device of an alignment film according to claim 1, wherein, in the irradiation light pattern, the first overlapping region and the second overlapping region are connected by a first connection region to which only the linearly polarized light in the first polarization direction is applied, the first overlapping region and the third overlapping region are connected by a second connection region to which only the linearly polarized light in the second polarization direction is applied, and the second overlapping region and the third overlapping region are connected by a third connection region to which only the linearly polarized light in the third polarization direction is applied.

3. The manufacturing device of an alignment film according to claim 2, wherein, in the irradiation light pattern, the first irradiation light amount pattern has a maximal value of an irradiation light amount in the first connection region, the second irradiation light amount pattern has a maximal value of an irradiation light amount in the second connection region, and the third irradiation light amount pattern has a maximal value of an irradiation light amount in the third connection region.

4. The manufacturing device of an alignment film according to claim 1, wherein the laminate in which the photo-alignment film material layer is provided on the substrate is a single sheet-like body.

5. The manufacturing device of an alignment film according to claim 1, wherein an alignment pattern formed in the photo-alignment film material layer has a non-parallel pattern depending on the irradiation light pattern.

6. The manufacturing device of an alignment film according to claim 5, wherein the non-parallel pattern is a pattern in which an alignment direction changes in a circular manner in at least one direction.

7. The manufacturing device of an alignment film according to claim 1, wherein an alignment pattern formed in the photo-alignment film material layer is a vortex alignment pattern depending on the irradiation light pattern.

8. The manufacturing device of an alignment film according to claim 1, wherein an alignment pattern formed in the photo-alignment film material layer includes a pattern in which an alignment angle changes in proportion to a polar angle in polar coordinate display from a center, depending on the irradiation light pattern.

9. The manufacturing device of an alignment film according to claim 1, wherein the light source unit has a mask that adjusts the intensity of the light.

10. The manufacturing device of an alignment film according to claim 9, wherein the first polarized light irradiation, the second polarized light irradiation, and the third polarized light irradiation are carried out in a state where the mask is disposed in close contact with the photo-alignment film material layer.

11. The manufacturing device of an alignment film according to claim 9, wherein the mask that adjusts the intensity of the light has regions having different transmittances corresponding to each of the first irradiation light amount pattern, the second irradiation light amount pattern, and the third irradiation light amount pattern.

12. The manufacturing device of an alignment film according to claim 2, wherein the laminate in which the photo-alignment film material layer is provided on the substrate is a single sheet-like body.

13. The manufacturing device of an alignment film according to claim 2, wherein an alignment pattern formed in the photo-alignment film material layer has a non-parallel pattern depending on the irradiation light pattern.

14. The manufacturing device of an alignment film according to claim 13, wherein the non-parallel pattern is a pattern in which an alignment direction changes in a circular manner in at least one direction.

15. The manufacturing device of an alignment film according to claim 2, wherein an alignment pattern formed in the photo-alignment film material layer is a vortex alignment pattern depending on the irradiation light pattern.

16. The manufacturing device of an alignment film according to claim 2, wherein an alignment pattern formed in the photo-alignment film material layer includes a pattern in which an alignment angle changes in proportion to a polar angle in polar coordinate display from a center, depending on the irradiation light pattern.

17. The manufacturing device of an alignment film according to claim 2, wherein the light source unit has a mask that adjusts the intensity of the light.

18. The manufacturing device of an alignment film according to claim 17, wherein the first polarized light irradiation, the second polarized light irradiation, and the third polarized light irradiation are carried out in a state where the mask is disposed in close contact with the photo-alignment film material layer.

19. The manufacturing device of an alignment film according to claim 17, wherein the mask that adjusts the intensity of the light has regions having different transmittances corresponding to each of the first irradiation light amount pattern, the second irradiation light amount pattern, and the third irradiation light amount pattern.

20. The manufacturing device of an alignment film according to claim 3, wherein the laminate in which the photo-alignment film material layer is provided on the substrate is a single sheet-like body.

* * * * *